(12) United States Patent
Jiang

(10) Patent No.: US 11,395,175 B2
(45) Date of Patent: Jul. 19, 2022

(54) METHOD, DEVICE AND SYSTEM OF PROCESSING DATA PACKET IN DATA BEARER REMAPPING PROCESS

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/639,856

(22) PCT Filed: Sep. 29, 2017

(86) PCT No.: PCT/CN2017/104579
§ 371 (c)(1),
(2) Date: Feb. 18, 2020

(87) PCT Pub. No.: WO2019/033521
PCT Pub. Date: Feb. 21, 2019

(65) Prior Publication Data
US 2020/0367092 A1 Nov. 19, 2020

(30) Foreign Application Priority Data
Aug. 18, 2017 (WO) ................ PCT/CN2017/098080

(51) Int. Cl.
*H04W 28/02* (2009.01)
*H04L 1/18* (2006.01)
(Continued)

(52) U.S. Cl.
CPC ....... *H04W 28/0263* (2013.01); *H04L 1/1861* (2013.01); *H04L 5/0055* (2013.01); *H04W 80/08* (2013.01)

(58) Field of Classification Search
CPC .............. H04W 28/0263; H04W 80/08; H04L 1/1861; H04L 5/0055; H04L 1/188;
(Continued)

(56) References Cited

U.S. PATENT DOCUMENTS 9,191,982 B2  11/2015  Wu
2015/0215965 A1  7/2015  Yamada
(Continued)

FOREIGN PATENT DOCUMENTS

CN  102598779 A  7/2012
CN  103069916 A  4/2013
(Continued)

OTHER PUBLICATIONS

3GPP TSG-RAN WG2 Meeting #98; R2-1705782; Source: CMCC; Title: SDAP header format optimization ; Hangzhou, China, May 15-19, 2017 (Year: 2017).*
(Continued)

*Primary Examiner* — Hassan A Phillips
*Assistant Examiner* — Mohammed S Chowdhury
(74) *Attorney, Agent, or Firm* — Syncoda LLC; Feng Ma

(57) ABSTRACT

A method for data packet processing in a data radio bearer (DRB) remapping process includes: in a data transmission process of a target data stream, when it is detected that a DRB remapping event occurs, stopping delivering data packets of the target data stream to an original DRB, and delivering data packets of the target data stream that are not delivered to the original DRB to a target DRB; and when it is detected that data packets of the target data stream that are delivered to the original DRB are completely sent, if the original DRB is configured to operate in a non-transmission feedback determination mode, sending to a receiving terminal a completion indication message for predetermined times by means of the original DRB. A problem that the
(Continued)

receiving terminal cannot further deliver a received data packet and thus a data packet delivery process will be indefinitely delayed can therefore be overcome.

15 Claims, 12 Drawing Sheets

(51) Int. Cl.
*H04L 5/00* (2006.01)
*H04W 80/08* (2009.01)

(58) Field of Classification Search
CPC ... H04L 1/0041; H04L 1/0045; H04L 1/1607; H04L 1/18; H04L 5/0053
See application file for complete search history.

(56) References Cited

U.S. PATENT DOCUMENTS

| | | | |
|---|---|---|---|
| 2015/0327094 A1 | 11/2015 | Lee et al. | |
| 2019/0053098 A1* | 2/2019 | Jo | H04W 80/08 |
| 2019/0349810 A1* | 11/2019 | Cho | H04W 28/06 |
| 2019/0357076 A1* | 11/2019 | Han | H04W 28/08 |
| 2020/0008118 A1* | 1/2020 | Han | H04W 68/005 |
| 2020/0022213 A1* | 1/2020 | Han | H04L 1/1642 |
| 2020/0068427 A1* | 2/2020 | Turtinen | H04W 28/06 |
| 2020/0245183 A1* | 7/2020 | Sun | H04W 28/24 |
| 2021/0204160 A1* | 7/2021 | Jo | H04L 47/2441 |

FOREIGN PATENT DOCUMENTS

| | | |
|---|---|---|
| CN | 103517351 A | 1/2014 |
| CN | 103875196 A | 6/2014 |
| CN | 104144505 A | 11/2014 |
| CN | 104244426 A | 12/2014 |
| CN | 104904254 A | 9/2015 |
| CN | 105917727 A | 8/2016 |
| CN | 106488568 A | 3/2017 |
| CN | 106538037 A | 3/2017 |
| CN | 106993313 A | 7/2017 |
| CN | 107005898 A | 8/2017 |
| WO | 2014000498 A1 | 1/2014 |
| WO | 2017118935 A1 | 7/2017 |

OTHER PUBLICATIONS

3GPP TSG-RAN WG2 Meeting AH;R2-1706787; Source: Huawei, HiSilicon; Title: QoS Flow to DRB Re-Mapping; Qingdao, China, Jun. 27-29, 2017 (Year: 2017).*
3GPP TSG-RAN WG2 Meeting #NR AH2 ; R2-1706382; Source: CATT; Title:QoS re-mapping of QoS flow and DRB Qingdao, China, Jun. 27-29, 2017. (Year: 2017).*
3GPP TSG-RAN WG2 NR Adhoc #2;R2-1706553; Source: Nokia, Alcatel-Lucent Shanghai Bell; Qingdao, Title: QoS flow relocation ;China, Jun. 27-29, 2017 (Year: 2017).*
3GPP TSG-RAN WG2 NR Ad Hoc #2;R2-1706815; Source: LG Electronics Inc.; Title : QoS flow to DRB remapping; Qingdao, China, Jun. 27-29, 2017 (Year: 2017).*
3GPP TSG-RAN WG2 #98-AH; Tdoc R2-1707159; Source: Ericsson; Title: SDAP Header Format, Qingdao, P.R. of China, Jun. 27-29, 2017 (Year: 2017).*
3GPP TSG-RAN WG2 #98-AH; Tdoc R2-1707161;Source: Ericsson ; Title: QoS Flow Remapping Within the Same Cell and in Handover, Qingdao, P.R. of China, Jun. 27-29, 2017. (Year: 2017).*
3GPP TSG-RAN2 Meeting #98; R2-1704552, Source : LG Electronics Inc., Title : QoS flow to DRB remapping, Hangzhou, China, May 15-19, 2017 (Year: 2017).*
International search report of PCT application No. PCT/CN2017/104579 dated Apr. 27, 2018.
First office action of Chinese application No. 201780001141.7 dated Nov. 4, 2020.
Huawei, HiSilicon; Reflective QoS and Reflective DRB Mapping; 3GPP TSG-RAN2 NR Ad Hoc R2-1700087, Jan. 19, 2017, entire document.
International search report of PCT application No. PCT/CN2017/098080 dated May 9, 2018.
First office action of Chinese application No. 201780000857.5 dated Jun. 24, 2020.
Notification to grant patent right for invention of Chinese application No. 201780001141.7 dated Apr. 26, 2021.
Nokia, Alcatel-Lucent Shanghai Bell, UL DRB mapping, 3GPP TSG-RAN WG2 Meeting #96 R2-167668; Nov. 18, 2016, entire document.

* cited by examiner

METHOD, DEVICE AND SYSTEM OF PROCESSING DATA PACKET IN DATA BEARER REMAPPING PROCESS

CROSS-REFERENCE TO RELATED APPLICATION

This application is a national stage of International Application No. PCT/CN2017/104579 filed on Sep. 29, 2017, which claims priority to International Application No. PCT/CN2017/098080 filed on Aug. 18, 2017. The disclosures of these applications are hereby incorporated by reference in their entirety.

TECHNICAL FIELD

The present disclosure relates to the field of wireless communication technology, and more particularly to a method, device, and system for data packet processing in a data bearer remapping process.

BACKGROUND

The 5G (5th-Generation, fifth-generation mobile communication) technology follows the previous 4G (4th-Generation, fourth-generation mobile communication) technology: the communication process is divided into a user interface and a control interface, wherein the user interface mainly comprises three layers: a Packet Data Convergence Protocol (PDCP) layer, an Radio Link Control (RLC) layer, and a Media Access Control (MAC) layer that are sequentially arranged from top to bottom. With the in-depth study on 5G technology, in addition to the above three layers, a new layer is introduced onto the PDCP layer, which can be called as a SDAP (Service Data Adaptation Protocol) layer. In the SDAP layer, an important task to be completed is to map a data packet to a DRB (Data Radio Bearer), that is, to allocate a DRB that transmits the data packet to the data packet, and transmit the data packet through the DRB that it is mapped to.

Typically, a sending end (e.g., a terminal) and a receiving end (i.e., a base station) will transmit multiple data streams in one session, and each data stream comprises multiple data packets. In the process of transmitting one data stream, a DRB remapping event occurs in some specific cases, that is, the mapping between data packets of a target data stream and the DRB is switched from an original DRB to a target DRB. If data packets of the same target data stream are being transmitted when a DRB remapping event occurs, how to continue the transmission of the data packets of the target data stream becomes a problem.

In related arts, if a DRB remapping event occurs, the sending end will still send the data packets in the target data stream that have been mapped to the original DRB through the original DRB, and subsequent data packets are delivered to the target DRB for transmission. After completing sending of the data packets, the original DRB sends to the receiving end a transmission completion indication message for indicating that the data packets of the target data stream that have been delivered to the original DRB have been sent. Before receiving the transmission completion indication message, the receiving end performs sequential delivery processing on the data packets sent by the sending end through the original DRB, and buffers the data packets sent by the sending end through the target DRB, and waits for delivery, and after receiving the transmission completion indication message, starts to perform sequential delivery processing on the data packets sent by the sending end through the target DRB. The sequential delivery processing is to deliver the data packets from the PDCP layer to the SDAP layer in numbering order.

In the process of implementing the present disclosure, the inventors found that at least the following problems exist:

Because an error may occur during the process of sending the transmission completion indication message, the receiving end may not receive the transmission completion indication message and wait for it all the time, such that further delivery processing cannot be performed on the received data packet, and the data packet delivery process may be delayed indefinitely.

SUMMARY

In order to overcome the problems in the related arts, the present disclosure provides the following technical solutions:

According to a first aspect of the embodiments of the present disclosure, there is provided a method of processing data packets in a data bearer remapping process, the method comprises:

stopping delivering to an original DRB a data packet of a target data stream and delivering to a target DRB the data packet of the target data stream that is not delivered to the original DRB, upon detecting occurrence of a DRB remapping event in data transmission process of a target data stream;

sending a predetermined number of transmission completion indication messages to a receiving end through the original DRB if the original DRB is configured to operate in a non-transmission feedback determination mode, after detecting that the data packet of the target data stream delivered to the original DRB has been sent;

wherein the transmission completion indication message is used to indicate that the data packet of the target data stream delivered to the original DRB in the DRB remapping process has been sent.

Optionally, the transmission completion indication message is generated by a SDAP layer or a PDCP layer.

Optionally, the transmission completion indication message comprises a target data stream identifier.

Optionally, the transmission completion indication message further comprises preset ending indication information.

Optionally, the transmission completion indication message is generated by a SDAP layer and is a SDAP PDU data packet, a header of the SDAP PDU data packet comprises the target data stream identifier, and a body of the SDAP PDU data packet is empty.

Optionally, stopping delivering to the original DRB the data packet of the target data stream and delivering to the target DRB the data packet of the target data stream that is not delivered to the original DRB, upon detecting occurrence of the DRB remapping event in data transmission process of the target data stream, comprises:

when it is determined that the original DRB and the target DRB operate in a sequential transmission mode simultaneously, stopping delivering to the original DRB a data packet of a target data stream and delivering to the target DRB the data packet of the target data stream that is not delivered to the original DRB, upon detecting occurrence of a DRB remapping event occurs in data transmission process of a target data stream.

According to a second aspect of the embodiments of the present disclosure, there is provided a method of processing data packets in a data bearer remapping process, the method comprises:

receiving a data packet of a target data stream sent by a sending end; and performing sequential delivery processing on the data packet of the target data stream sent by the sending end through a target DRB in the DRB remapping process after receiving any transmission completion indication message sent by the sending end through an original DRB of the sending end, wherein the transmission completion indication message is used to indicate that the data packet of the target data stream delivered to the original DRB of the sending end in the DRB remapping process has been sent.

Optionally, performing sequential delivery processing on the data packet of the target data stream sent by the sending end through the target DRB in the DRB remapping process after receiving any transmission completion indication message sent by the sending end through the original DRB of the sending end, comprises:

detecting whether the data packet of the target data stream sent by the sending end through the original DRB in the DRB remapping process comprises an out-of-order data packet on which the reordering operation is not performed after receiving any transmission completion indication message sent by the sending end through the original DRB of the sending end; and performing sequential delivery processing on the data packet of the target data stream sent by the sending end through the target DRB in the DRB remapping process after the out-of-order data packet is sorted, when the data packet of the target data stream sent by the sending end through the original DRB in the DRB remapping process comprises an out-of-order data packet on which the reordering operation is not performed.

Optionally, the method further comprises:

starting a timer to perform timing upon detecting occurrence of a DRB remapping event in the data transmission process of the target data stream;

performing a sequential delivery processing on the data packet of the target data stream sent by the sending end through the target DRB in the DRB remapping process after the timer expires.

Optionally, the method further comprises:

starting a timer to perform timing when receiving a first data packet of the target data stream sent by the sending end through the target DRB of the sending end; and performing a sequential delivery processing on the data packet of the target data stream sent by the sending end through the target DRB in the DRB remapping process after the timer expires.

According to a third aspect of the embodiments of the present disclosure, there is provided a device for processing data packets in a data bearer remapping process, the device comprises:

a delivering module configured to, stop delivering to an original DRB a data packet of a target data stream and deliver to a target DRB the data packet of the target data stream that is not delivered to the original DRB, upon detecting occurrence of a DRB remapping event in data transmission process of a target data stream;

a sending module configured to send a predetermined quantity of transmission completion indication messages to the receiving end through the original DRB when the original DRB is configured to operate in a non-transmission feedback determination mode, after detecting that the data packet of the target data stream delivered to the original DRB has been sent;

wherein the transmission completion indication message is used to indicate that the data packet of the target data stream delivered to the original DRB in the DRB remapping process has been sent.

Optionally, the transmission completion indication message is generated by a SDAP layer or a PDCP layer.

Optionally, the transmission completion indication message comprises a target data stream identifier.

Optionally, the transmission completion indication message further comprises a preset ending indication information.

Optionally, the transmission completion indication message is generated by a SDAP layer and is a SDAP PDU data packet, a header of the SDAP PDU data packet comprises the target data stream identifier, and a body of the SDAP PDU data packet is empty.

Optionally, the delivering module is configured to stop delivering to an original DRB the data packet of the target data stream and deliver to a target DRB the data packet of the target data stream that is not delivered to the original DRB upon detecting occurrence of a DRB remapping event in data transmission process of a target data stream, when it is determined that the original DRB and the target DRB operate in a sequential transmission mode simultaneously.

According to a fourth aspect of the embodiments of the present disclosure, there is provided a device for processing data packets in a data bearer remapping process, the device comprises:

a receiving module, configured to receive a data packet of a target data stream sent by a sending end;

a delivering module, configured to perform sequential delivery processing on the data packet of the target data stream sent by the sending end through the target DRB in the DRB remapping process after receiving any transmission completion indication message sent by the sending end through the original DRB of the sending end, wherein the transmission completion indication message is used to indicate that the data packet of the target data stream delivered to the original DRB of the sending end in the DRB remapping process has been sent.

Optionally, the delivering module comprises:

a detecting unit, configured to detect whether the data packet of the target data stream sent by the sending end through the original DRB in the DRB remapping process comprises an out-of-order data packet on which the reordering operation is not performed after receiving any transmission completion indication message sent by the sending end through the original DRB of the sending end; and a delivering unit, configured to perform sequential delivery processing on the data packet of the target data stream sent by the sending end through the target DRB in the DRB remapping process after the out-of-order data packet is sorted, when the data packet of the target data stream sent by the sending end through the original DRB in the DRB remapping process comprises an out-of-order data packet on which the reordering operation is not performed.

Optionally, the device further comprises:

a first startup module, configured to start a timer to perform timing upon detecting occurrence of a DRB remapping event occurs in the data transmission process of the target data stream;

after the timer expires, the delivering module performs a sequential delivery processing on the data packet of the target data stream sent by the sending end through the target DRB in the DRB remapping process.

Optionally, the device further comprises:

a second startup module, configured to start a timer to perform timing when receiving a first data packet of the target data stream sent by the sending end through the target DRB of the sending end; and after the timer expires, the delivering module performs sequential delivery processing on the data packet of the target data stream sent by the sending end through the target DRB in the DRB remapping process.

According to a fifth aspect of the embodiments of the present disclosure, there is provided a system for processing data packets in a data bearer remapping process, the system comprises a receiving end and a sending end; the sending end is configured to stop delivering to an original DRB a data packet of a target data stream and deliver to a target DRB the data packet of the target data stream that is not delivered to the original DRB upon detecting occurrence of a DRB remapping event in data transmission process of a target data stream; send, through the original DRB, a predetermined quantity of transmission completion indication messages to the receiving end when the original DRB is configured to operate in a non-transmission feedback determination mode, after detecting that the data packet of the target data stream that has been delivered to the original DRB has been sent; wherein the transmission completion indication message is used to indicate that the data packet of the target data stream delivered to the original DRB in the DRB remapping process has been sent;

the receiving end is configured to receive the data packet of the target data stream sent by the sending end; perform the sequential delivery processing on the data packet of the target data stream sent by the sending end through the target DRB in the DRB remapping process after receiving any transmission completion indication message sent by the sending end through the original DRB of the sending end, wherein the transmission completion indication message is used to indicate that the data packet of the target data stream delivered to the original DRB of the sending end in the DRB remapping process has been sent.

According to a sixth aspect of the embodiments of the present disclosure, there is provided a sending end, the receiving end comprises a processor and a memory, the memory storing at least one instruction, at least one program, a code set or a set of instructions, which is loaded and executed by a processor to implement the method of processing data packets in a data bearer remapping process as described above.

According to a seventh aspect of the embodiments of the present disclosure, there is provided a computer readable storage medium, characterized in that, the storage medium stores at least one instruction, at least one program, a code set or a set of instructions, which is loaded and executed by a processor to implement the method of processing data packets in a data bearer remapping process as described above.

According to an eighth aspect of the embodiments of the present disclosure, there is provided a receiving end, the sending end comprises a processor and a memory storing at least one instruction, at least one program, a code set or a set of instructions, which is loaded and executed by a processor to implement the method of processing data packets in a data bearer remapping process as described above.

According to a ninth aspect of the embodiments of the present disclosure, there is provided a computer readable storage medium, characterized in that, the storage medium stores at least one instruction, at least one program, a code set or a set of instructions, which is loaded and executed by the processor to implement the method of processing data packets in a data bearer remapping process as described above.

The technical solutions provided by the embodiments of the present disclosure may comprise the following beneficial effects:

With the method provided by the embodiment of the present disclosure, since the original DRB is configured to operate in the non-transmission feedback determination mode, if a packet loss event occurs in the process of transmitting a predetermined number of transmission completion indication messages to the receiving end through the original DRB, the sending end cannot determine whether a packet loss event has occurred. Therefore, the predetermined number of transmission completion indication messages may be sent to the receiving end by the original DRB. The predetermined number can be surely pre-configured in the sending end. When the predetermined number of transmission completion indication messages are sent to the receiving end by the original DRB, even if the sending end cannot determine whether a packet loss event has occurred, since the number of times of the transmission completion indication is not always one, the probability of successfully sending the transmission completion indication message to the receiving end by the original DRB is greatly improved. In other words, it overcomes the drawback that the receiving end cannot perform further delivery processing on the received data packet, and the data packet delivery process is delayed indefinitely.

It is to be understood that both the foregoing general description and the following detailed description are exemplary and explanatory only and are not intended to limit the present disclosure.

BRIEF DESCRIPTION OF THE DRAWINGS

In order to describe the technical solutions in the embodiments of the present more clearly, the following briefly introduces the accompanying drawings required for describing the embodiments. Apparently, the accompanying drawings in the following description show merely some embodiments of the present disclosure, and a person of ordinary skill in the art may also derive other drawings from these accompanying drawings without creative efforts.

FIG. 2A-1 is a flowchart of a method of processing data packet in a data bearer remapping process according to an exemplary embodiment;

FIG. 2A-2 is a flowchart of a method of processing data packet in a data bearer remapping process according to an exemplary embodiment;

FIG. 2A-3 is a flowchart of a method of processing data packet in a data bearer remapping process according to an exemplary embodiment;

FIG. 2B-1 is a flowchart of a method of processing data packet in a data bearer remapping process according to an exemplary embodiment;

FIG. 2B-2 is a flowchart of a method of processing data packet in a data bearer remapping process according to an exemplary embodiment;

FIG. 2B-3 is a flowchart of a method of processing data packet in a data bearer remapping process according to an exemplary embodiment;

FIG. 3 is a flowchart of a method of processing data packet in a data bearer remapping process according to an exemplary embodiment;

DETAILED DESCRIPTION

Figure 1:
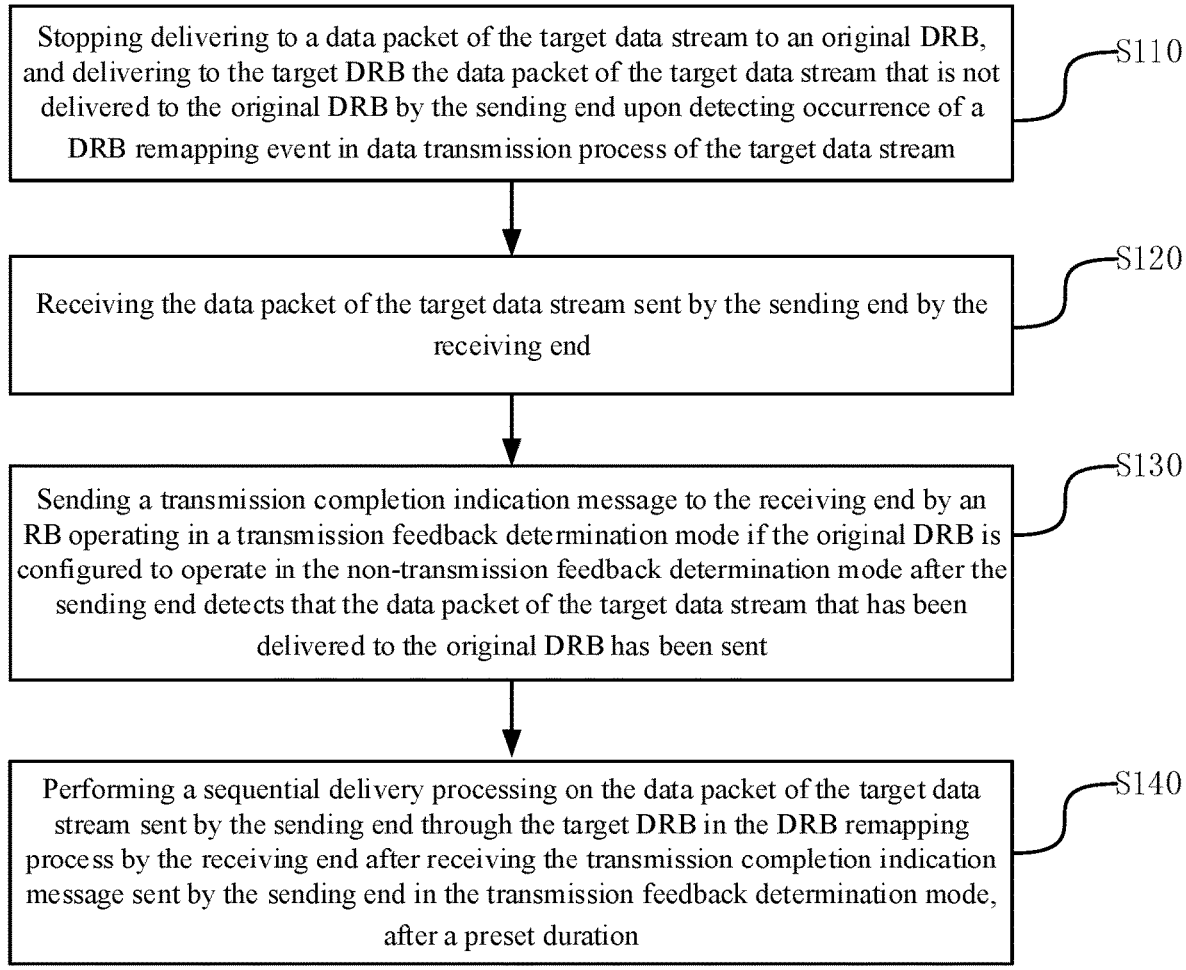
FIG. 1 is a flowchart of a method of processing data packet in a data bearer remapping process according to an exemplary embodiment.

The present disclosure will be described in further detail with reference to the accompanying drawings, to present the objects, technical solutions, and advantages of the present disclosure more clearly.

The embodiment of the present disclosure provides a method of processing data packets in a data bearer remapping process, which may be implemented by a receiving end and a sending end together. If the receiving end is a base station, the sending end may be a terminal. And similarly, if the receiving end is a terminal, the sending end may be a base station.

The terminal may be a mobile phone, a tablet computer, a desktop computer, a notebook computer, or the like. The terminal can comprise components such as a transceiver, a processor, a memory, and the like. The transceiver can be configured for data transmission with the base station, for example, may send data packets of the target data stream to the base station, and the transceiver can comprise a Bluetooth component, a Wi-Fi (Wireless-Fidelity) component, an antenna, a matching circuit, a modem, etc. The processor may be a CPU (Central Processing Unit) or the like, and may be configured to perform the processing such as, in data transmission process of a target data stream, stopping delivering to an original DRB a data packet of a target data stream and delivering to a target DRB the data packet of the target data stream that is not delivered to the original DRB, when detecting that a DRB remapping event occurs. The memory may be a RAM (Random Access Memory), a Flash (flash memory), etc., and may be used to store received data, data required for the processing, data generated during the processing, and the like, e.g., data packets of a target data stream.

The terminal may further comprise an input component, a display component, an audio output component, and the like. The input component can be a touch screen, a keyboard, a mouse, or the like. The audio output component may be a speaker, a headphone, or the like.

It should be noted that, in the 5G technology, the layers comprised in the communication underlying structure are the SDAP layer, the PDCP layer, the RLC layer, and the MAC layer from top to bottom. When the sending end establishes a session with the receiving end, multiple data streams may be transmitted in the process of the session, and each data stream may comprise multiple data packets, and the data packets are delivered from top to bottom in the communication underlying structure of the sending end, until it is sent to the receiving end through the last layer. These data packets exist in the sending end in the form of data streams before being split into packets, and the SDAP layer can allocate DRBs for these data streams to transmit these data streams. After the SDAP layer allocates DRBs for these data streams, the data streams are delivered to the lower layer in the form of data packets. During the initial allocation, the DRBs allocated to the same data stream are the same. Of course, for some specific reasons, a DRB remapping event may occur during transmission of the same data stream. If a DRB remapping event occurs, it cannot be ensured that the same data stream is still transmitted through the same DRB.

In actual transmission, there are multiple DRBs. In the PDCP layer, the RLC layer, and the MAC layer, each layer has sub-modules that support respective DRBs, and the module may be a virtual software module. When each layer receives the data packets delivered from the upper layer, these data packets are allocated in the sub-modules supporting the DRBs allocated to the data packets corresponding to each layer for processing.

In addition, the base station unified manages the mapping relationship between a data stream and a DRB. After the base station determines the mapping relationship between a data stream and a DRB, an RRC (Radio Resource Control) message can be generated based on the mapping relationship between the data stream and the DRB and sent to the target terminal. After receiving the RRC message, the target terminal may instruct the SDAP layer to allocate DRB to the data stream according to the mapping relationship between the data stream and the DRB in the RRC message. In addition to unifiedly managing the mapping relationship between the data stream and the DRB, the base station may further configure respective DRBs to enable whether support a function of sequential delivery or not, and send an information indicating whether each DRB enables supporting the function of sequential delivery to the target terminal through the RRC message, and send information indicating whether respective DRBs enable the function of supporting the sequential delivery to the target terminal. After receiving the RRC message, the target terminal can configure respective DRBs.

An exemplary embodiment of the present disclosure provides a method of processing data packets in a data bearer remapping process. As illustrated in FIG. 1, the processing flow of the method may comprise the following steps:

At step S110, in data transmission process of the target data stream, upon detecting occurrence of a DRB remapping event, the sending end stops delivering to a data packet of the target data stream to an original DRB, and delivers to the target DRB the data packet of the target data stream that is not delivered to the original DRB.

In the implementation, due to the occurrence of the DRB remapping event, it is no longer necessary to continue to transmit the data packet of the target data stream through the original DRB, but instead, the remaining data packet of the target data stream needs to be sent through the target DRB. Therefore, upon detecting occurrence of a DRB remapping event, the sending end stops delivering to the original DRB the data packet of the target data stream, and delivers to the target DRB the target data of the target data stream that is not delivered to the original DRB.

At step S120, a receiving end receives the data packet of the target data stream sent by the sending end.

In the implementation, the data packet of the target data stream received by the receiving end may be sent through the original DRB of the sending end, or through the target DRB of the sending end. At the receiving end, the original DRB and the target DRB also exist corresponding to the sending end. If the data packet of the target data stream is sent to the receiving end through the original DRB of the sending end, the receiving end receives it through the original DRB of the receiving end, and if the data packet of the target data stream is sent to the receiving end through the target DRB of the sending end, the receiving end receives it through the target DRB of the receiving end. At the receiving end, the data packets of the target data stream sent through the original DRB of the sending end and through the target DRB of the sending end are received separately through the original DRB of the receiving end and through the target DRB of the receiving end. Therefore, at the receiving end, the two parts of data are separately delivered to the upper layer on two channels, and the receiving end can distinguish the two parts of data.

In an implementation, further, after the receiving end receives the data packet of the target data stream sent by the sending end, the received data packets of the target data stream can be reordered at a reordering window corresponding to the original DRB and the target DRB, respectively.

At step S130, after the sending end detects that the data packet of the target data stream that has been delivered to the original DRB has been sent, if the original DRB is configured to operate in the non-transmission feedback determination mode, the transmission completion indication message is sent to the receiving end by an RB operating in a transmission feedback determination mode, wherein the transmission completion indication message is configured to indicate that the data packet of the target data stream delivered to the original DRB in the DRB remapping process has been sent.

In the implementation, the step S120 and the step S130 in the embodiment of the present disclosure do not have a necessary sequential relationship. Step S120 may be performed simultaneously with step S130. For example, when the receiving end has received or not completely received the data packet of the target data stream sent by the sending end through the original DRB of the sending end, the sending end may have sent out the transmission completion indication message. Or, when the receiving end has received the data packet of the target data stream sent by the sending end through the original DRB of the sending end, but not received the data packet of the target data stream sent by the sending end through the target DRB of the sending end, the sending end may have sent out the transmission completion indication message. In the embodiment of the present disclosure, as long as the sending end detects that the data packet of the target data stream that has been delivered to the original DRB has been sent, the transmission completion indication message can be sent to the receiving end.

After the sending end detects through the RLC layer that the data packet of the target data stream that has been delivered to the original DRB has been sent, it can notify the upper layer that the data packet of the target data stream that has been delivered to the original DRB has been sent. In the implementation of the present disclosure, three manners of generating the transmission completion indication message are provided, and the layers generating the transmission completion indication message through the three manners may be the same or different. Specifically, for example, if the transmission completion indication message is an RRC message, the transmission completion indication message is generated at the upper layer of the SDAP layer. If the transmission completion indication message is a PDU (Packet Data Unit) packet of the SDAP layer rather than an RRC message, the transmission completion indication message is generated at the SDAP layer. As such, after the sending end detects through the RLC layer that the data packet of the target data stream that has been delivered to the original DRB has been sent, it is required to determine the layer generating the transmission completion indication message, and then the RLC layer notifies the layer that the data packet of the target data stream that has been delivered to the original DRB has been sent.

After the sending end detects that the data packet of the target data stream that has been delivered to the original DRB has been sent, if the original DRB is configured to operate in a transmission feedback determination mode, the sending end sends a transmission completion indication message to the receiving end through the original DRB. Since the original DRB is configured to operate in the transmission feedback determination mode, it may still continue to send the transmission completion indication message to the receiving end through the original DRB. If the original DRB is configured to operate in the non-transmission feedback determination mode, the transmission completion indication message is sent to the receiving end through the RB operating in the transmission feedback determination mode. Since the original DRB is not configured to operate in the transmission feedback determination mode, in order to ensure that the transmission completion indication message can be sent to the receiving end securely, or when the transmission completion indication message cannot be sent to the receiving end, the sending end can have corresponding countermeasures to deal with, it needs to send the transmission completion indication message to the receiving end through the RB operating in the transmission feedback determination mode, wherein the transmission completion indication message may comprise an original DRB identifier, a target data stream identifier, and an identifier indicating that the data packet of the target data stream that has been delivered to the original DRB has been sent, such as "complete," "finish," "accomplish," and the like.

Optionally, in the implementation of the present disclosure, it provides two manners through which the sending end sends the transmission completion indication message to the receiving end through the RB operating in the transmission feedback determination mode. Correspondingly, the step S130 may comprise: sending a transmission completion indication message to the receiving end through a SRB (Signaling Radio Bearer) operating in the transmission feedback determination mode; or determining a DRB for transmitting the transmission completion indication message, configuring the DRB for transmitting the transmission completion indication message to operate in the transmission feedback determination mode, and sending the transmission completion indication message through the configured DRB.

In the implementation, as to the manner of sending the transmission completion indication message to the receiving end through the SRB operating in the transmission feedback determination mode, the content of the transmission completion indication message may be carried in the RRC message and sent to the receiving end. For the RRC message, it is sent to the receiving end through the SRB. For a message sent to the receiving end through the SRB, if receiving the message, the receiving end will automatically feed back an ACK (Acknowledgement) message. For the DRB determined for sending the transmission completion indication message, the DRB for transmitting the transmission completion indication message is configured to operate in the transmission feedback determination mode; in the manner of sending the transmission completion indication message through the configured DRB, a DRB that transmits a message in a transmission feedback determination mode may be specifically configured for the transmission completion indication message, and the transmission completion indication message is sent through the configured DRB; the receiving end will inevitably feed back an acknowledgement message after receiving the transmission completion indication message. Therefore, optionally, after receiving the transmission completion indication message, the receiving end feeds back an acknowledgement message to the sending end. Correspondingly, after sending the transmission completion indication message to the receiving end, the sending end resends the transmission completion indication message if not receiving the acknowledgement message fed back by the receiving end upon the transmission completion indication message within a preset duration.

In the implementation, if the receiving end receives the transmission completion indication message, it will feed back an acknowledgement message to the sending end. If an error occurs in the process of the receiving end feeding back an acknowledgement message to the sending end, or the receiving end does not receive the transmission completion indication message and does not feed back the acknowledgement message to the sending end, the sending end cannot receive the acknowledgement message fed back by the receiving end upon the transmission completion indication message. At the sending end, after the sending end sends out the transmission completion indication message, a timer with the preset duration A can be started to perform timing. If the acknowledgement message fed back by the receiving end upon the transmission completion indication message is not received after the timer expires, the transmission completion indication message is resent, to prevent that the receiving end is kept waiting for the transmission completion indication message when not receiving the transmission completion indication message, thereby delaying subsequent processing on the data packets.

At step S140, after receiving the transmission completion indication message sent by the sending end in the transmission feedback determination mode, after a preset duration, the receiving end performs a sequential delivery processing on the data packet of the target data stream sent by the sending end through the target DRB in the DRB remapping process, wherein the transmission completion indication message is used to indicate that the data packet of the target data stream delivered to the original DRB has been sent in the DRB remapping process.

In the implementation, if the sending end sends the data packet of the target data stream to the receiving end through the original DRB and the target DRB simultaneously, it is possible that the receiving end has received the data packet of the target data stream sent by the sending end through the original DRB and the target DRB. When the receiving end receives the data packet of the target data stream sent by the sending end through the original DRB and through the target DRB, the data packets of the target data stream sent by the sending end through the original DRB and through the target DRB are reordered at the reordering window respectively. For the data packet of the target data stream sent by the sending end through the original DRB, it is delivered to the upper layer at each time when any data packet is reordered. For the data packet of the target data stream sent by the sending end through the target DRB, it is buffered after being reordered, and it is not delivered to the upper layer.

When the transmission completion indication message sent by the sending end is received, the transmission completion indication message carries the original DRB identifier and the target data stream identifier. Therefore, after the transmission completion message is received, it is determined that the message is for indicating which data stream in which DRB; after it is determined that the message is for indicating which data stream in which DRB, the original DRB in the receiving end stops waiting for receiving subsequent data packets or will stop waiting to receive subsequent data packets after a preset duration B, since the subsequent data packets have been passed to be received in the target DRB. When the transmission completion indication message sent by the sending end is received, the reordered data packets of the target data stream sent by the sending end through the original DRB may have been delivered successively. In addition, since the transmission completion indication message may be sent to the receiving end by the DRB different from the original DRB, a transmission completion indication message that is sent lately may arrive at the receiving end prior to some individual data packets of the target data stream sent by the sending end through the original DRB. Therefore, after the receiving end receives the transmission completion indication message sent by the sending end in the transmission feedback determination mode, after the preset duration B, it is considered that it leaves enough time for the individual data packets of the target data stream sent by the sending end through the original DRB to be reordered and to be delivered to the upper layer; after that, the reordered data packets of the target data stream sent by the sending end through the original DRB are delivered to the upper layer.

It should be noted that the operation of reordering the data packets of the target data stream sent by the sending end may be performed at the PDCP layer or at the RLC layer. If it is performed at the PDCP layer, delivering to the upper layer refers to delivering to the SDAP layer, and then the SDAP layer delivers it to the application layer. If it is performed at the RLC layer, delivering to the upper layer refers to delivering to the PDCP layer, and then the PDCP layer delivers it to the SDAP layer, and the SDAP layer delivers it to the application layer.

Optionally, the embodiment of the present disclosure provides the following method of timing a preset duration. Correspondingly, the step S140 may comprise: after the receiving end receives the transmission completion indication message sent by the sending end in the transmission feedback determination mode, the receiving end starts a timer of a preset duration; when the timer expires, the receiving end performs the sequential delivery processing on the data packet of the target data stream sent through the target DRB in the DRB remapping process.

In the implementation, after receiving the transmission completion indication message sent by the sending end in the transmission feedback determination mode, the receiving end may start the time of the present duration B to time the preset duration B. If the timer of the preset duration B expires, the data packet of the target data stream sent by the sending end through the original DRB has been delivered to the upper layer at this time. After that, if the receiving end receives individual out-of-order data packets of the data stream sent through the original DRB again, it can select to delete them.

Optionally, when a DRB remapping event occurs, the sending end may first send the data packet of the target data stream that has been delivered to the original DRB through the original DRB, in addition to sending the data packet of the target data stream to the receiving end through the original DRB and the target DRB simultaneously. After it is sent, the transmission completion indication message is sent, and after receiving the acknowledgement message fed back by the receiving end upon the transmission completion indication message, remaining data packet of the target data stream is sent by the target DRB. The method provided by the embodiment of the present disclosure further comprises: after receiving the acknowledgement message fed back by the receiving end upon the transmission completion indication message, sending the data packet of the target data stream to the receiving end through the target DRB.

In the implementation, if the time point at which the data packet of the target data stream is transmitted through the original DRB and the target DRB is controlled at the sending end through the above manner, the data packet of the target data stream sent through the target DRB arrives at the receiving end after the data packet of the target data stream sent through the original DRB, so that the data packet of the target data stream sent through the target DRB does not need to wait in the buffer for a long time at the receiving end, it is reordered immediately after it is received and then delivered to the upper layer.

Optionally, upon detecting occurrence of a DRB remapping event during performing data transmission of the target data stream, delivering the target data stream to the original DRB will be stopped, and before delivering to the target DRB the data packet of the target stream that is not delivered to the original DRB, it is determined whether both the original DRB and the target DRB operate in the sequential transmission mode simultaneously or not, if yes, step S110 to step S140 according to the embodiment of the present disclosure will be performed, and otherwise, if the sequential transmission is not required, there is no need to waste control resource to control delivery timing the data packet of the target data stream. Correspondingly, step S110 may comprise: if it is determined that both the original DRB and the target DRB operate in the sequential transmission mode simultaneously, stopping delivering data packet of the target data stream to the original DRB, delivering to the target DRB data packet of the target DRB that is not delivered to the original DRB upon detecting occurrence of the DRB remapping event during performing data transmission of the target data stream, and delivering to the target DRB the data packet of the target data stream that is not delivered to the original DRB.

Figures 1, 2A:
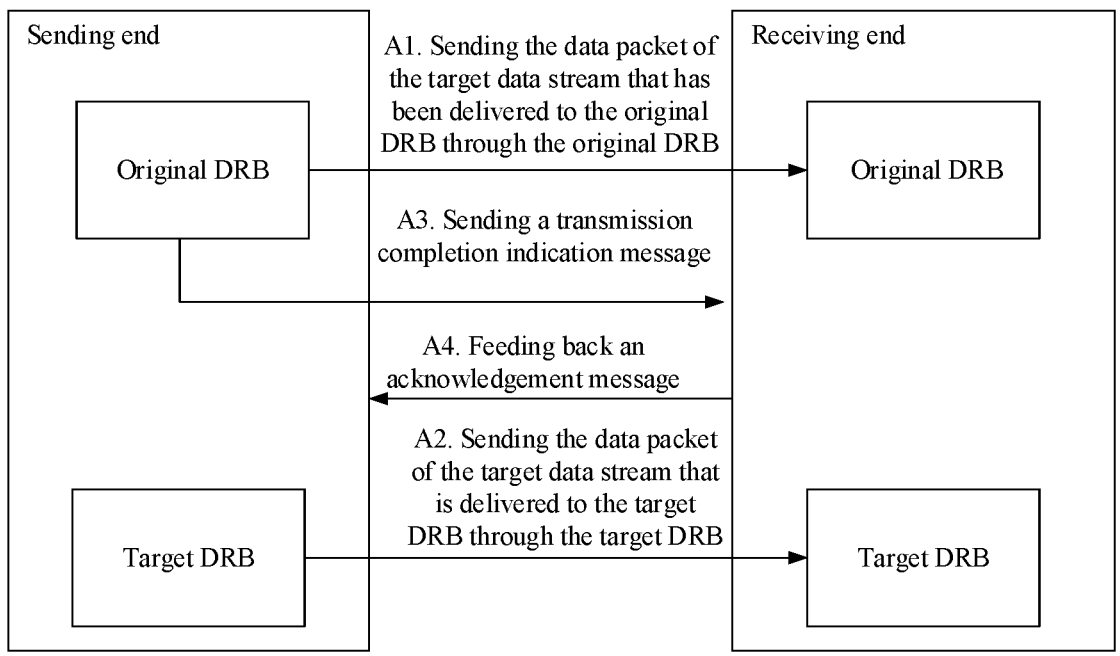
Figures 2, 2A:
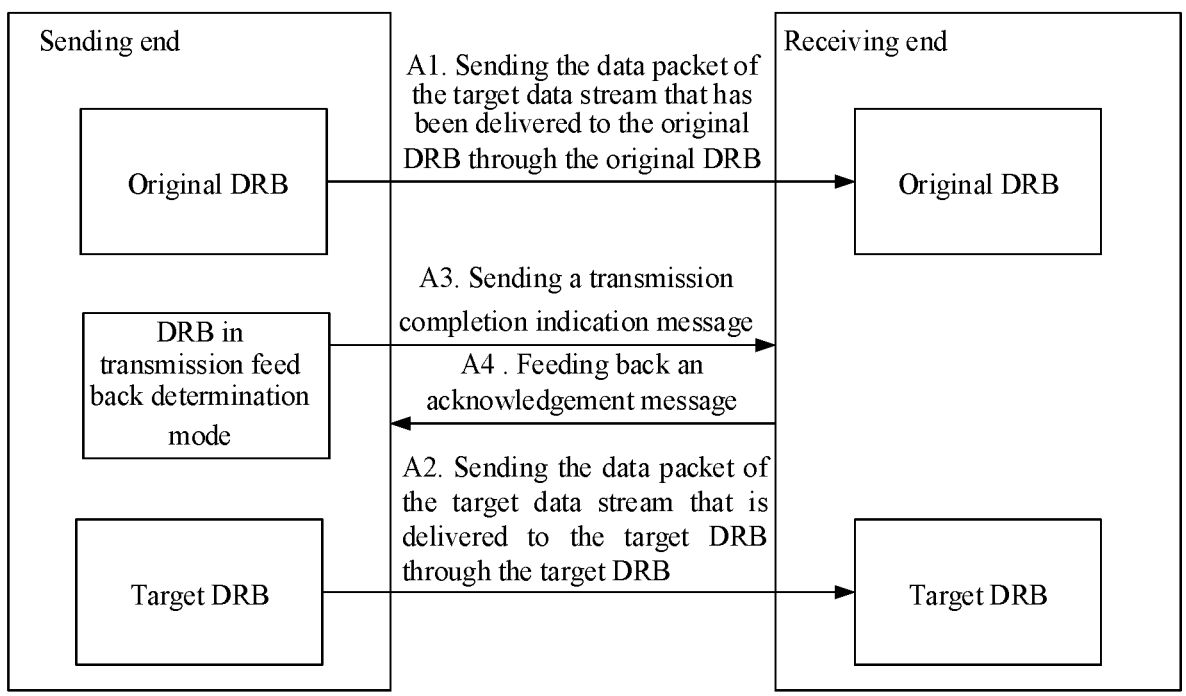
Figures 2, 2A, 3:
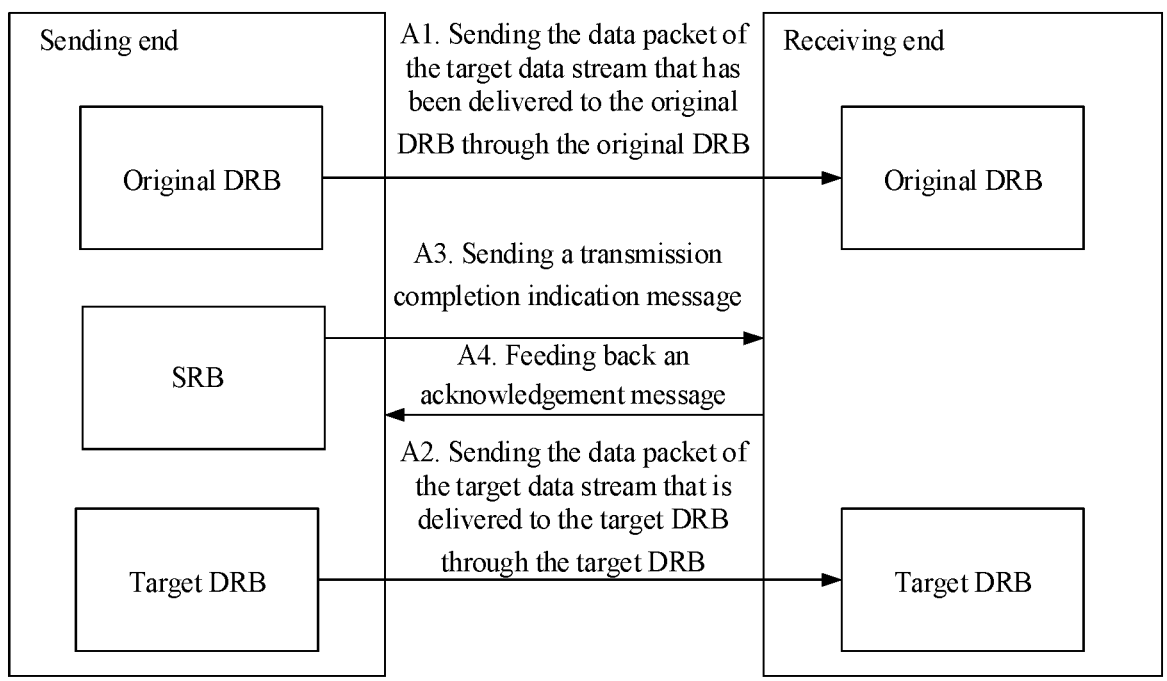

As such, as illustrated in FIGS. 2A-1, 2A-2, and 2A-3, in a possible embodiment of the present disclosure, the sending end first performs A1: sending the data packet of the target data stream that has been delivered to the original DRB through the original DRB. After remaining packets of the target data stream are delivered to the target DRB, A2 is performed: sending the data packet of the target data stream that is delivered to the target DRB through the target DRB. A1 and A2 can be staggered in time. Then, after performing A1, it is triggered to perform A3: sending a transmission completion indication message. After receiving the transmission completion indication message, the receiving end may perform A4: feeding back an acknowledgement message. It should be noted that, in this case, the data packet of the target data stream sent through the target DRB is required to be buffered at the receiving end for a period of time before being delivered to the upper layer. The difference between FIGS. 2A-1, 2A-2, and 2A-3 is that channels for transmitting the transmission completion indication message are different. In FIG. 2A-1, the original DRB is in the transmission feedback determination mode, and the transmission completion indication message is sent through the original DRB. In FIG. 2A-2, the original DRB is in the non-transmission feedback determination mode, and a DRB in the transmission feedback determination mode can be specifically configured to send the transmission completion indication message. In FIG. 2A-3, the original DRB is in the non-transmission feedback determination mode, and the RRC message can be sent through the SRB originally in the transmission feedback determination mode, and the content of the completion indication message is carried.

Figures 1, 2B:
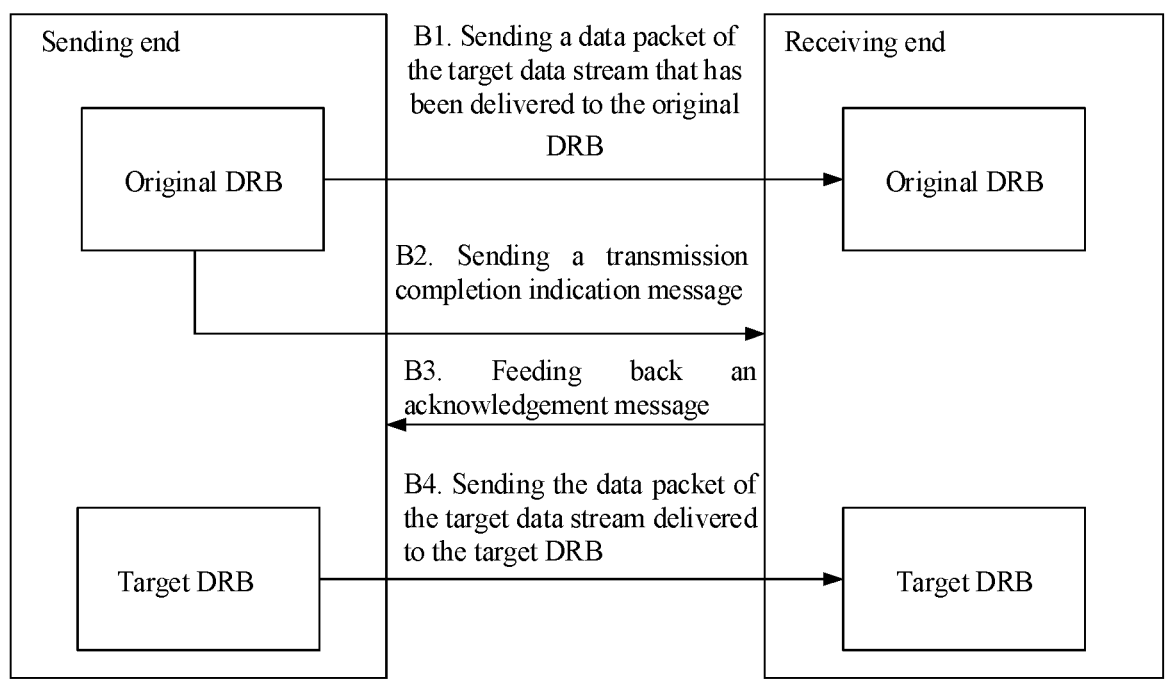
Figures 2, 2B:
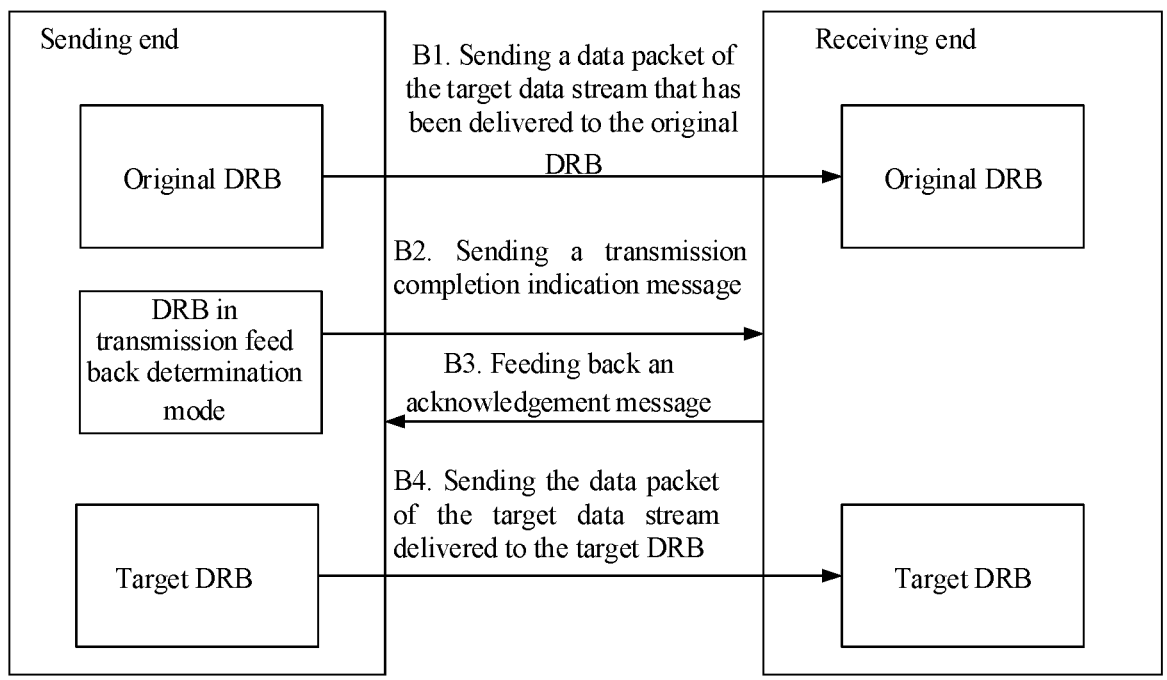
Figures 2, 2B, 3:
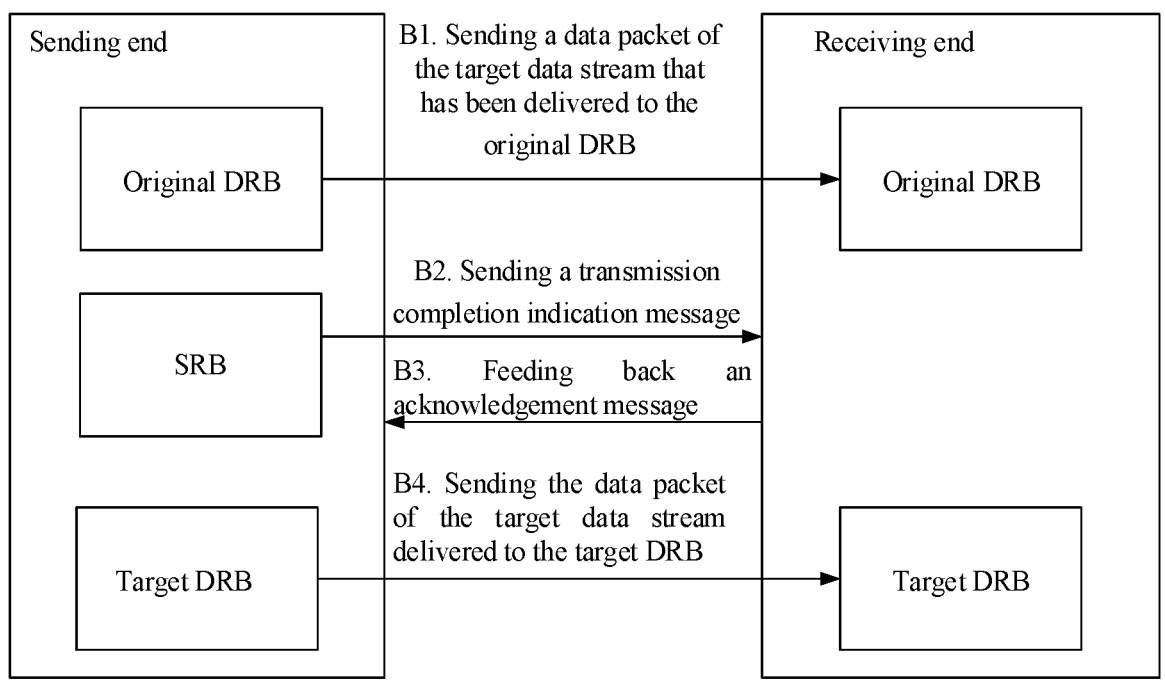
Figure 3:
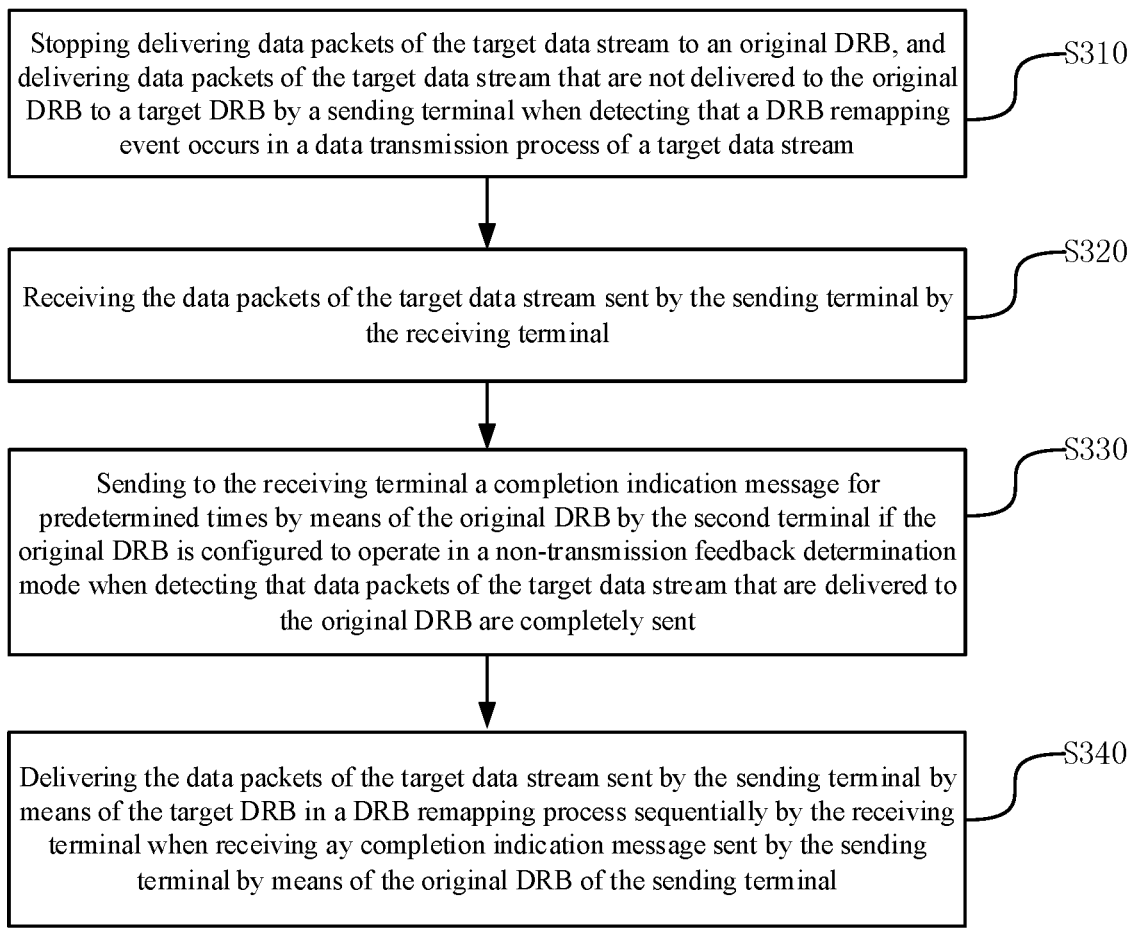

As illustrated in FIG. 2B-1, in another possible embodiment of the present disclosure, the sending end first performs B1: sending, through the original DRB, a data packet of the target data stream that has been delivered to the original DRB. After B1 is performed, it is triggered to perform B2: sending a transmission completion indication message. After receiving the transmission completion indication message, the receiving end can perform B3: feeding back an acknowledgement message. After receiving the transmission completion indication message, the sending end can perform B4: sending, through the target DRB, the data packet of the target data stream delivered to the target DRB. It should be noted that, in this case, since the timing of sending the data packet of the target data stream delivered to the target DRB through the target DRB has been controlled at the sending end, the sending end can directly performing reordering and delivering without buffering the data packet of the target data stream sent through the target DRB for a long time. The difference between FIGS. 2B-1, 2B-2, and 2B-3 is that channels for sending the transmission completion indication message are different. In FIG. 2B-1, the original DRB is in the transmission feedback determination mode, and the transmission completion indication message is sent through the original DRB. In FIG. 2B-2, the original DRB is in the non-transmission feedback determination mode, and a DRB in the transmission feedback determination mode can be specifically configured to send the transmission completion indication message. In FIG. 2B-3, the original DRB is in the non-transmission feedback determination mode, RRC message which carries content of the transmission completion indication message can be sent through the SRB originally in the transmission feedback determination mode.

By the method according to the embodiments of the present disclosure, after detecting that the data packet of the target data stream that has been delivered to the original DRB has been sent, if the original DRB is configured to operate in the non-transmission feedback determination mode, the transmission completion indication message is sent to the receiving end by the RB operating in the transmission feedback determination mode. In this way, it is ensured that the transmission completion indication message is sent in the transmission feedback determination mode. If the receiving end can successfully receive the transmission completion indication message, it must feed back to the sending end. Then the sending end can determine whether the receiving end has actually received the transmission completion indication message. In this way, even if an error occurs during sending the transmission completion indication message, the sending end will resend it, and the sending end will not be kept waiting for the transmission completion indication message all the time in a case of not receiving the transmission completion indication message. Thus, the drawback that the receiving end cannot perform further delivery processing on the received data packet such that the data packet delivery process will be delayed indefinitely.

An exemplary embodiment of the present disclosure provides a method of processing data packets in a data bearer remapping process. As illustrated in FIG. 3, the method comprises:

Step S310: upon detecting occurrence of a DRB remapping event in data transmission process of a target data stream, a sending end stops delivering to the original DRB a data packet of the target data stream, and delivers to the target DRB the data packet of the target data stream that is not delivered to the original DRB.

Step S320: the receiving end receives the data packet of the target data stream sent by the sending end.

Step S330: after the sending end detects that the data packet of the target data stream that has been delivered to the original DRB has been sent, if the original DRB is configured to operate in a non-transmission feedback determination mode, a predetermined number of transmission completion indication messages are sent to the receiving end through the original DRB, wherein the transmission completion indication message is used to indicate that the data packet of the target data stream delivered to the original DRB in the DRB remapping process has been sent.

In the implementation, since the original DRB is configured to operate in the non-transmission feedback determination mode, if a packet loss event occurs in the process of transmitting a predetermined number of transmission completion indication messages to the receiving end through the original DRB, the sending end cannot determine whether a packet loss event occurs. Therefore, the predetermined number of transmission completion indication messages can be sent to the receiving end through the original DRB. The predetermined number can be surely pre-configured in the sending end. When the predetermined number of transmission completion indication messages are sent to the receiving end through the original DRB, even if the sending end cannot determine whether a packet loss event has occurred, since the number of times of the transmission completion indication is not always one, the probability of successfully sending the transmission completion indication message to the receiving end through the original DRB is greatly improved.

Step S340: after receiving any transmission completion indication message sent by the sending end through the original DRB of the sending end, the receiving end performs sequential delivery processing on the data packet of the target data stream sent by the sending end through the target DRB in the DRB remapping process.

In the implementation, in the receiving end, although the sending end sends the transmission completion indication message for many times, the receiving end can trigger subsequent operation as long as any transmission completion indication message is received. The any completion indication message may be a transmission completion indication message received firstly.

Optionally, the method according to the embodiment further comprises: in the data transmission process of the target data stream, starting a timer to perform timing upon detecting occurrence of a DRB remapping event; performing a sequential delivery processing on the data packet of the target data stream sent by the sending end through the target DRB in the DRB remapping process after the timer expires.

In an implementation, when the base station instructs to switch the DRB, that is, when a DRB remapping event occurs, the timer may be triggered to perform timing. After the timer expires, the data packet of the target data stream sent by the sending end through the target DRB in the DRB remapping process is sequentially delivered. When the timer expires, even if the transmission completion indication message is not received, it no longer waits for the transmission completion instruction message, and the subsequent steps can be directly performed.

Optionally, the method according to the embodiment further comprises: starting a timer to perform timing when receiving a first data packet of the target data stream sent by the sending end through a target DRB of the sending end; performing a sequential delivery processing on the data packet of the target data stream sent by the sending end through the target DRB in the DRB remapping process after the timer expires.

In implementations, when the first data packet of the target data stream sent by the sending end through the target DRB of the sending end is received, the timer may be triggered to perform timing. After the timer expires, the data packet of the target data stream sent by the sending end through the target DRB in the DRB remapping process is sequentially delivered. When the timer expires, even if no transmission completion indication message is received, it no longer waits for the transmission completion instruction message, and the subsequent steps can be directly performed.

Optionally, the transmission completion indication message is generated by the SDAP layer or the PDCP layer.

In the implementation, the transmission completion indication message is generated by the SDAP layer at the sending end. Since the header of the SDAP PDU packet in the SDAP layer has typically 8 bits, and the target data stream identifier is generally not less than 7 bits, the header of the SDAP PDU packet can be placed in the target data stream identifier such as the ID of the target data stream can be placed in the header of the SDAP PDU packet, and the packet body is empty. When the receiving end receives a SDAP PDU packet with an empty body, it may be considered that the SDAP PDU packet without body indicates that the data stream corresponding to the ID of the target data stream carried in the packet header has been sent through the original DRB, and the original DRB stops waiting to receive the data packet subsequent to the data stream. If the transmission completion indication message is generated by the SDAP layer of the sending end, the transmission completion indication message is read by the SDAP layer of the receiving end. After the SDAP layer of the receiving end reads the transmission completion indication message, the data packet of the target data stream of the SDAP layer at the receiving end sent by the sending end through the target DRB in the DRB remapping process may be sequentially delivered. Specifically, the PDCP layer and the RLC layer of the receiving end are responsible for reordering the received data packets, and when the data packets are delivered to the SDAP layer, they are already sorted, so when the transmission completion indication message is generated by the SDAP layer of the sending layer, the transmission completion indication message is read by the SDAP layer of the receiving end; when the SDAP layer of the receiving end reads the transmission completion indication message, the data packet delivered by the PDCP layer through the target DRB and received at the SDAP layer can be continued to be delivered upward. There is no need to leave time for reordering data packets in this process since the data packet delivered by the PDCP layer through the target DRB and received at the SDAP layer is already sorted.

In the implementation, in the sending end, the transmission completion indication message is generated by the PDCP layer. The PDCP layer at the sending end can generate PDCP PDU control data packets and PDCP PDU user data packets. For the PDCP PDU control packet, the packet header can contain a large amount of data, so the target data stream identifier and the preset ending indication information can be put into the packet header, or the preset ending indication information can be put into the packet header, and the target data stream identifier is placed in the package body. The preset ending indication information may be "complete," "finish," "accomplish," and the like. In addition, for PDCP PDU user data packets, the packet header can contain a small amount of data, so the target data stream identifier such as the ID of the target data stream can be placed in the header of the PDCP PDU user data packet by a method similar to the SDAP PDU data packet, and the packet body is empty. When the receiving end receives a PDCP PDU user data packet with an empty packet body, it may be considered that the PDCP PDU user data packet without packet body indicates that the data stream corresponding to the ID of the target data stream carried in the packet header has been sent through the original DRB, and the original DRB stops waiting to receive the data packet subsequent to the data stream. If the completion indication message is generated by the PDCP layer of the sending end, the completion indication message is read by the PDCP layer of the receiving end. After the PDCP layer at the receiving end reads the completion indication message, if there is an out-of-order data packet in the original DRB when the completion indication message is received, it waits, after the out-of-order data packet in the original DRB is reordered before the completion indication message is received, to stop delivering, to the SDAP layer, the data packet of the target data stream received from the original DRB subsequently, and starts to perform the sequential delivery processing on the data packet of the target data stream sent by the sending end through the target DRB in the DRB remapping process. Correspondingly, optionally, the step S340 may comprise: after receiving any completion indication message sent by the sending end through the original DRB of the sending end, detecting whether the data packet of the target data stream sent by the sending end through the original DRB in the DRB remapping process comprises an out-of-order data packet in which the reordering operation is not performed; if the data packet of the target data stream sent by the sending end through the original DRB in the DRB remapping process comprises an out-of-order data packet in which the reordering operation is not performed, performing sequential delivery processing on the data packet of the target data stream sent by the sending end through the target DRB in the DRB remapping process after the out-of-order data packet is sorted.

As can be seen from the above, optionally, the completion indication message comprises a target data stream identifier, and the completion indication message further comprises preset ending indication information. The completion indication message is generated by the SDAP layer and is a SDAP PDU packet. The header of the SDAP PDU packet comprises the target data stream identifier, and the body of the SDAP PDU packet is empty.

Optionally, step S310 comprises: if it is determined that both the original DRB and the target DRB operate in a sequential transmission mode simultaneously, in data transmission process of a target data stream, stopping delivering to an original DRB a data packet of a target data stream and delivering to a target DRB the data packet of the target data stream that is not delivered to the original DRB, upon detecting occurrence of a DRB remapping event.

As such, for the method according to the embodiment, since the original DRB is configured to operate in the non-transmission feedback determination mode, if a packet loss event occurs in the process of transmitting a predetermined number of transmission completion indication messages to the receiving end through the original DRB, the sending end cannot determine whether a packet loss event has occurred. Therefore, the predetermined number of transmission completion indication messages may be sent to the receiving end through the original DRB. The predetermined number can be surely pre-configured in the sending end. When the predetermined number of transmission completion indication messages are sent to the receiving end through the original DRB, even if the sending end cannot determine whether a packet loss event has occurred, since the number of times of the transmission completion indication message is not always one, the probability of successfully sending the transmission completion indication message to the receiving end through the original DRB is greatly improved, which overcomes the drawback that the receiving end cannot perform subsequent delivery processing on the received data packet, and the data packet delivery process is delayed indefinitely.

Figure 4:
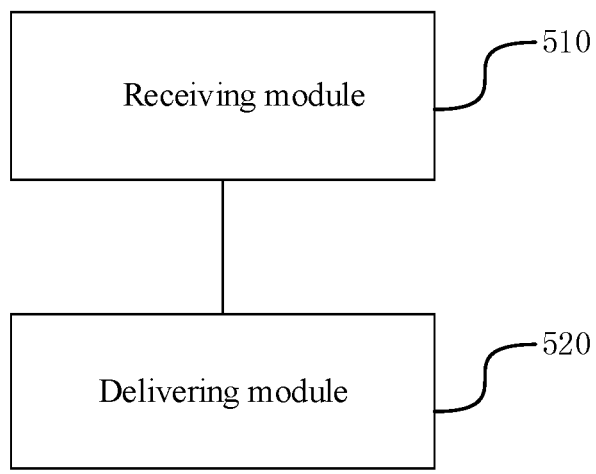
FIG. 4 is a schematic diagram of structure of a device of processing data packet in a data bearer remapping process according to an exemplary embodiment.

A further exemplary embodiment of the present disclosure provides a device for data packet processing in a data bearer remapping process. As illustrated in FIG. 4, the device comprises:

a delivering module 410 configured to stop delivering to an original DRB a data packet of a target data stream upon detecting occurrence of a DRB remapping event in data transmission process of the target data stream, and to deliver to a target DRB the data packet of the target data stream that is not delivered to the original DRB;

a sending module 420 configured to send, through the original DRB, a predetermined number of transmission completion indication messages to the receiving end if the original DRB is configured to operate in a non-transmission feedback determination mode, after detecting that the data packet of the target data stream that has been delivered to the original DRB has been sent;

wherein the transmission completion indication message is used to indicate that the data packet of the target data stream delivered to the original DRB in the DRB remapping process has been sent.

Optionally, the transmission completion indication message is generated by an SDAP layer or a PDCP layer.

Optionally, the transmission completion indication message comprises a target data stream identifier.

Optionally, the transmission completion indication message further comprises preset ending indication information.

Optionally, the transmission completion indication message is generated by the SDAP layer, and is an SDAP PDU data packet. The header of the SDAP PDU data packet comprises the target data stream identifier, and a body of the SDAP PDU data packet is empty.

Optionally, the delivering module 410 is configured to: in data transmission process of a target data stream, stop delivering to an original DRB the data packet of the target data stream and deliver to a target DRB the data packet of the target data stream that is not delivered to the original DRB upon detecting occurrence of a DRB remapping event, if it is determined that both the original DRB and the target DRB operate in a sequential transmission mode simultaneously.

Figure 5:
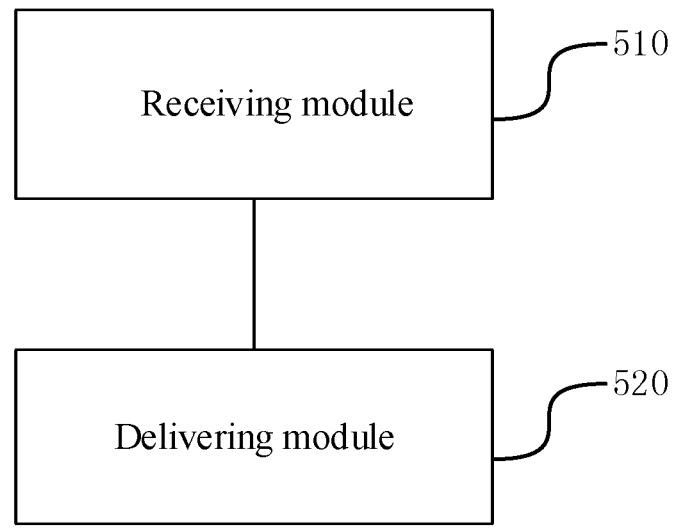
FIG. 5 is a schematic diagram of structure of a device of processing data packet in a data bearer remapping process according to an exemplary embodiment.

A further exemplary embodiment of the present disclosure provides a device for data packet processing in a data bearer remapping process. As illustrated in FIG. 5, the device comprises:

a receiving module 510, configured to receive a data packet of a target data stream sent by a sending end;

a delivering module 520, configured to perform sequential delivery processing on the data packet of the target data stream sent by the sending end through the target DRB in the DRB remapping process after receiving any transmission completion indication message sent by the sending end through the original DRB of the sending end, wherein the transmission completion indication message is used to indicate that the data packet of the target data stream delivered to the original DRB of the sending end in the DRB remapping process has been sent.

Optionally, the delivering module 520 comprises:

a detecting unit, configured to detect whether the data packet of the target data stream sent by the sending end through the original DRB in the DRB remapping process comprises an out-of-order data packet on which the reordering operation is not performed after receiving any transmission completion indication message sent by the sending end through the original DRB of the sending end;

a delivering unit, configured to perform sequential delivery processing on the data packet of the target data stream sent by the sending end through the target DRB in the DRB remapping process after the out-of-order data packet is sorted, when the data packet of the target data stream sent by the sending end through the original DRB in the DRB remapping process comprises an out-of-order data packet in which the reordering operation is not performed.

Optionally, the device further comprises:

a first startup module, configured to, in the data transmission process of the target data stream, starting a timer to perform timing when detecting occurrence of a DRB remapping event;

after the timer expires, the delivering module 520 performs sequential delivery processing on the data packet of the target data stream sent by the sending end through the target DRB in the DRB remapping process.

Optionally, the device further comprises:

a second startup module, configured to start a timer to perform timing when receiving a first data packet of the target data stream sent by the sending end through the target DRB of the sending end;

after the timer expires, the delivering module 520 performs sequential delivery processing on the data packet of the target data stream sent by the sending end through the target DRB in the DRB remapping process.

With regard to the devices in the above embodiments, the specific manners in which the respective modules perform the operations have been described in detail in the embodiment relating to the method, and will not be elaborated herein.

As such, for the device according to this embodiment, since the original DRB is configured to operate in the non-transmission feedback determination mode, if a packet loss event occurs in the process of transmitting a predetermined number of transmission completion indication messages to the receiving end through the original DRB, the sending end cannot determine whether a packet loss event has occurred. Therefore, the predetermined quantity of transmission completion indication messages can be sent to the receiving end through the original DRB. The predetermined quantity can be surely pre-configured in the sending end. When the predetermined number of transmission completion indication messages are sent to the receiving end through the original DRB, even if the sending end cannot determine whether a packet loss event has occurred, since the number of times of the transmission completion indication is not completely one, the probability of successfully sending the transmission completion indication message to the receiving end through the original DRB is greatly improved, which overcomes the drawback that the receiving end cannot perform further delivery processing on the received data packet, and process for delivering the data packet is delayed indefinitely.

It should be noted that, when the device for data packet processing in the data bearer remapping process according to the foregoing embodiment processes the data packet in the data bearer remapping process, it is illustrated only by the division of the foregoing functional modules. In practice, the above functions can be assigned to be completed by different functional modules as needed, that is, internal structures of the sending end and the receiving end are divided into different functional modules to complete all or part of the functions described above. In addition, the device for processing data packets in the data bearer remapping process according to the foregoing embodiment is in the same concept as the method of processing data packets in the data bearer remapping process, and the specific implementation process is described in the method embodiment, and details are not described herein again.

Figure 6:
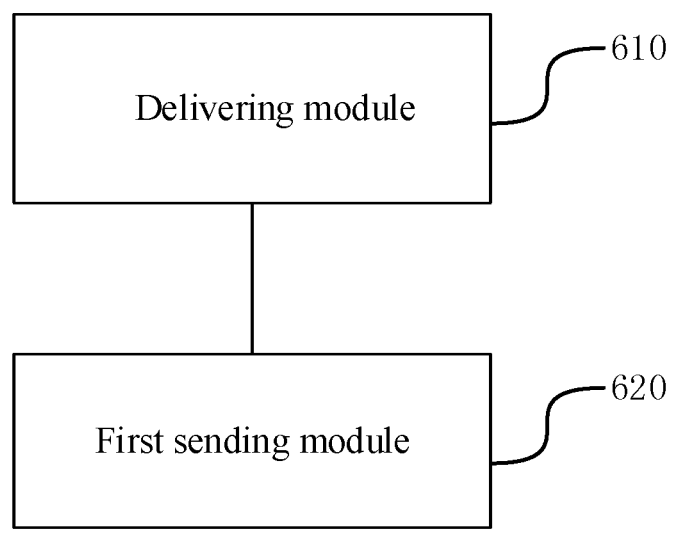
FIG. 6 is a schematic diagram of structure of a device of processing data packet in a data bearer remapping process according to an exemplary embodiment.

A further exemplary embodiment of the present disclosure provides a device for processing data packets in a data bearer remapping process. As illustrated in FIG. 6, the device comprises:

a delivering module 610 configured to, in data transmission process of a target data stream, stop delivering to an original DRB a data packet of a target data stream and deliver to a target DRB the data packet of the target data stream that is not delivered to the original DRB, upon detecting occurrence of a DRB remapping event;

a first sending module 620 configured to, after detecting that the data packet of the target data stream that has been delivered to the original DRB has been sent, send a transmission completion indication message to the receiving end through an RB operating in the transmission feedback determination mode if the original DRB is configured to operate in the non-transmission feedback determination mode, wherein the transmission completion indication message is used to indicate that the data packet of the target data stream delivered to the original DRB in the DRB remapping process has been sent.

Optionally, the first sending module 620 is configured to:

send the transmission completion indication message to the receiving end through the SRB operating in the transmission feedback determination mode; or determine the DRB for sending the transmission completion indication message, configure the DRB for sending the transmission completion indication message to operate in a transmission feedback determination mode, and send the transmission completion indication message through the configured DRB.

Optionally, the delivering module 610 is configured to: in data transmission process of the target data stream, stop delivering to the original DRB the data packet of the target data stream and deliver to the target DRB the data packet of the target data stream that is not delivered to the original DRB upon detecting occurrence of the DRB remapping event, if it is determined that both the original DRB and the target DRB operate in a sequential transmission mode simultaneously.

Optionally, the device further comprises:

a resending module configured to resend the transmission completion indication message, if the acknowledgement message fed back by the receiving end based on the transmission completion indication message is not received within the preset duration after sending the transmission completion indication message to the receiving end.

Optionally, the device further comprises:

a second sending module, configured to send, through the target DRB, the data packet of the target data stream to the receiving end after receiving an acknowledgement message fed back by the receiving end based on the transmission completion indication message.

Figure 7:
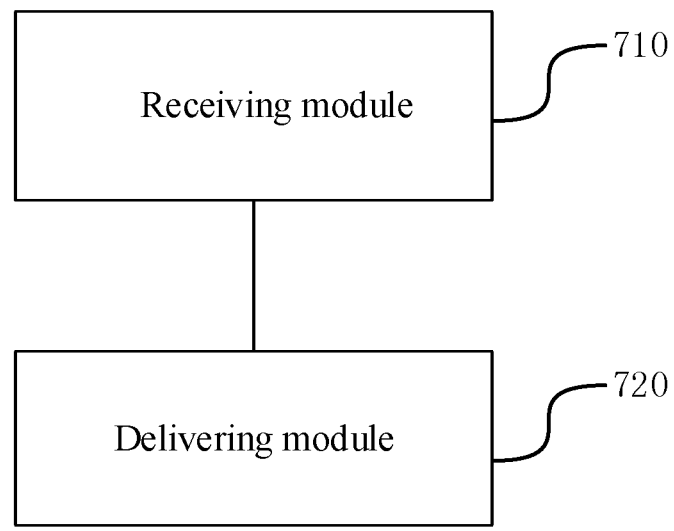
FIG. 7 is a schematic diagram of structure of a device of processing data packet in a data bearer remapping process according to an exemplary embodiment.

A further exemplary embodiment of the present disclosure provides a device for processing data packets in a data bearer remapping process. As illustrated in FIG. 7, the device comprises:

a receiving module 710 configured to receive a data packet of the target data stream sent by the sending end;

a delivering module 720 configured to: after receiving the transmission completion indication message sent by the sending end in the transmission feedback determination mode, perform sequential delivery processing on the data packet of the target data stream sent by the sending end through the target DRB in the DRB remapping process after the preset duration, wherein the transmission completion indication message is used to indicate that the data packet of the target data stream delivered to the original DRB in the DRB remapping process has been sent.

Figure 8:
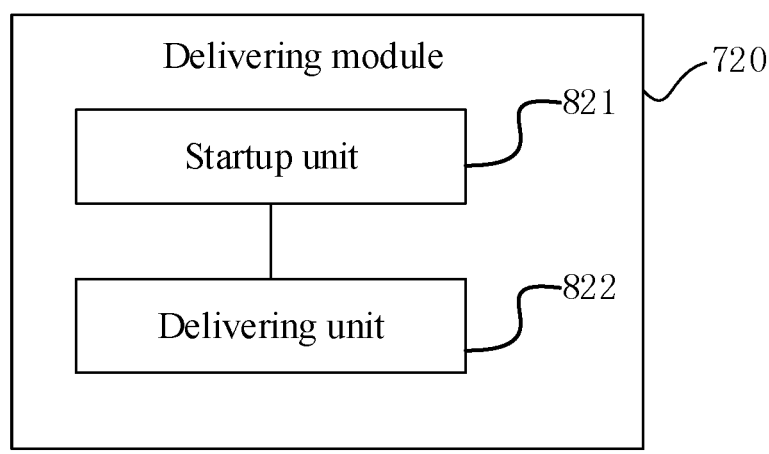
FIG. 8 is a schematic diagram of structure of a device of processing data packet in a data bearer remapping process according to an exemplary embodiment.

Optionally, as illustrated in FIG. 8, the delivering module 720 comprises:

a startup unit 821 configured to start a timer of a preset duration after receiving the transmission completion indication message sent by the sending end in the transmission feedback determination mode;

a delivering unit 822 configured to perform sequential delivery processing on the data packet of the target data stream sent by the sending end through the target DRB in the DRB remapping process when the timer expires.

Optionally, the device further comprises:

a feedback module, configured to feed back an acknowledgement message to the sending end after receiving the transmission completion indication message.

With regard to the devices in the above embodiments, the specific manners in which the respective modules perform the operations have been described in detail in the embodiment relating to the method, and will not be elaborated herein.

Through the device according to the embodiment of the present disclosure, after detecting that the data packet of the target data stream that has been delivered to the original DRB has been sent, if the original DRB is configured to operate in the non-transmission feedback determination mode, the transmission completion indication message is sent to the receiving end through the RB operating in the transmission feedback determination mode. In this way, it is ensured that the transmission completion indication message is sent in the transmission feedback determination mode. If the receiving end can successfully receive the transmission completion indication message, it must be fed back to the sending end. Then the sending end can determine whether the receiving end has actually received the transmission completion indication message. In this way, even if an error occurs during the process of sending the transmission completion indication message, the sending end will resend it, and it is unlikely that the receiving end does not receive the transmission completion indication message and is kept waiting for it all the time, which overcomes the drawback that the receiving end cannot perform further delivery processing on the received data packet, and the data packet delivery process will be delayed indefinitely.

It should be noted that, when the device for data packet processing in the data bearer remapping process according to the foregoing embodiment processes the data packet in the data bearer remapping process, it is illustrated only by the division of the foregoing functional modules. In practice, the above functions can be assigned to be completed by different functional modules as needed, that is, internal structures of the sending end and the receiving end are divided into different functional modules to complete all or part of the functions described above. In addition, the device for processing data packets in the data bearer remapping process according to the foregoing embodiment is in the same concept as the method of processing data packets in the data bearer remapping process, and the specific implementation process is described in the method embodiment, and details are not elaborated herein.

Yet another exemplary embodiment of the present disclosure provides a system for data packet processing in a data bearer remapping process, the system comprising a receiving end and a sending end.

The sending end is configured to: in data transmission process of a target data stream, stop delivering to an original DRB a data packet of a target data stream and deliver to a target DRB the data packet of the target data stream that is not delivered to the original DRB, upon detecting occurrence of a DRB remapping event; after detecting that the data packet of the target data stream that has been delivered to the original DRB has been sent, send the transmission completion indication message to the receiving end through the RB operating in the transmission feedback determination mode if the original DRB is configured to operate in the non-transmission feedback determination mode; wherein the transmission completion indication message is used to indicate that the data packet of the target data stream delivered to the original DRB in the DRB remapping process has been sent.

The receiving end is configured to: receive the data packet of the target data stream sent by the sending end; after receiving a transmission completion indication message sent by the sending end in the transmission feedback determination mode, and perform sequential delivery processing on the data packet of the target data stream sent by the sending end through the target DRB in the DRB remapping process after the preset duration.

A further exemplary embodiment of the present disclosure provides a system for processing data packets in a data bearer remapping process, wherein the system comprises a receiving end and a sending end; the sending end is configured to, in data transmission process of a target data stream, stop delivering to an original DRB a data packet of a target data stream and deliver to a target DRB the data packet of the target data stream that is not delivered to the original DRB, upon detecting occurrence of a DRB remapping event; send, through the original DRB, a predetermined quantity of transmission completion indication messages to the receiving end if the original DRB is configured to operate in a non-transmission feedback determination mode, after detecting that the data packet of the target data stream that has been delivered to the original DRB has been sent; wherein the transmission completion indication message is used to indicate that the data packet of the target data stream delivered to the original DRB in the DRB remapping process has been sent;

the receiving end is configured to receive the data packet of the target data stream sent by the sending end; perform sequential delivery processing on the data packet of the target data stream sent by the sending end through the target DRB in the DRB remapping process after receiving any transmission completion indication message sent by the sending end through the original DRB of the sending end, wherein the transmission completion indication message is used to indicate that the data packet of the target data stream delivered to the original DRB of the sending end in the DRB remapping process has been sent.

Regarding the system in the above embodiment, the specific manners in which the sending end and the receiving end perform operations have been described in detail in the embodiment related to the method, and will not be elaborated herein.

Yet another exemplary embodiment of the present disclosure illustrates a schematic diagram of structure of a terminal. The terminal can be configured as the sending end or the receiving end in the above embodiment.

Figure 9:
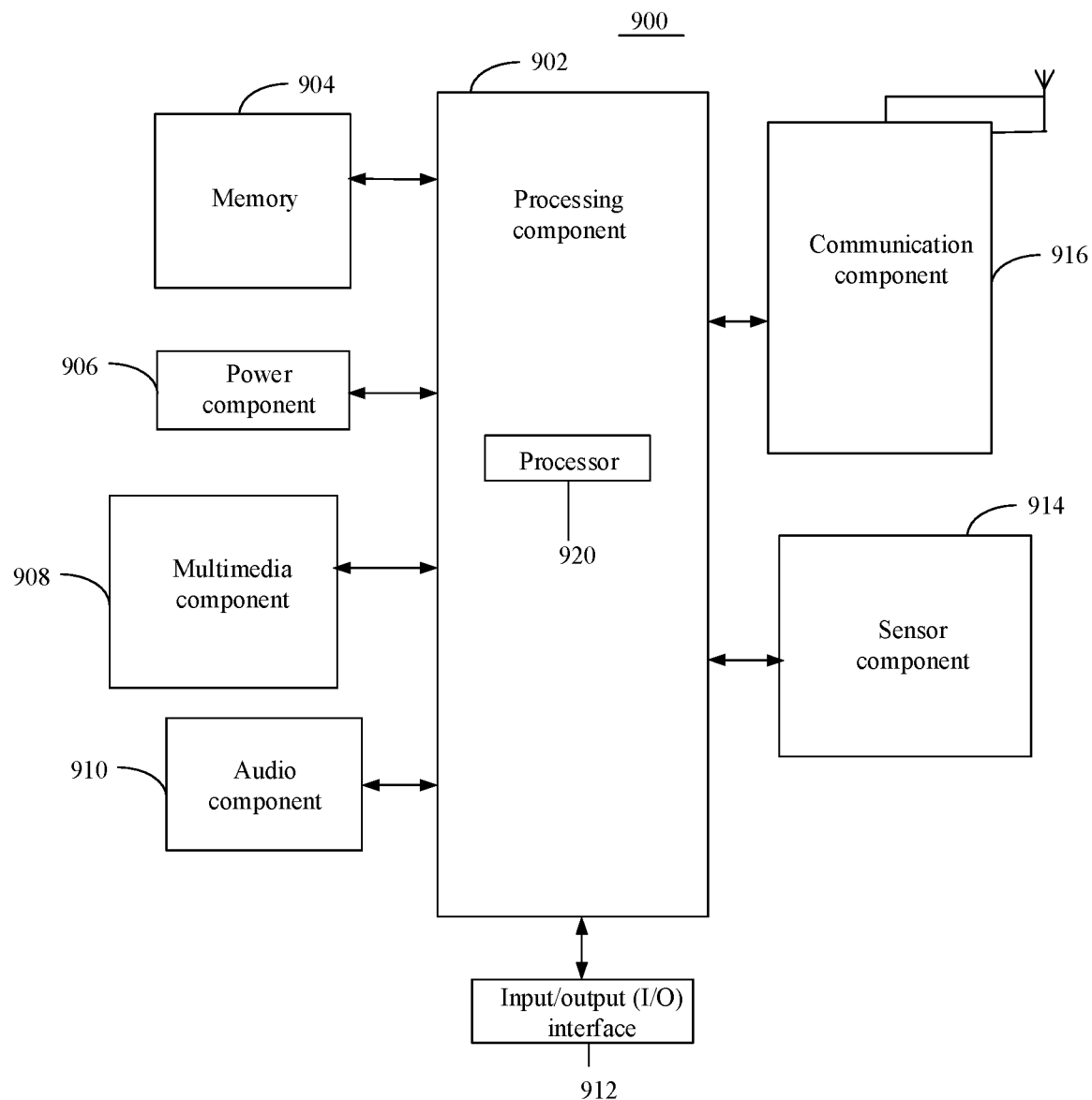
FIG. 9 is a schematic structural view of a terminal according to an exemplary embodiment.

Referring to FIG. 9, the terminal 900 may comprise one or more of the following components: a processing component 902, a memory 904, a power component 906, a multimedia component 908, an audio component 910, an input/output (I/O) interface 912, a sensor component 914, and a communication component 916.

The processing component 902 typically controls the overall operations of the terminal 900, such as operations associated with display, telephone calls, data communications, camera operations, and recording operations. The processing component 902 may comprise one or more processors 920 to execute instructions to perform all or part of the steps in the above described methods. Moreover, the processing component 902 may comprise one or more modules which facilitate interaction between the processing component 902 and other components. For instance, the processing component 902 may comprise a multimedia module to facilitate interaction between the multimedia component 908 and the processing component 902.

The memory 904 is configured to store various types of data to support the operation of the terminal 900. Examples of such data comprise instructions for any applications or methods operated on the terminal 900, contact data, phonebook data, messages, pictures, videos, etc. The memory 904 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the terminal 900. The power component 906 may comprise a power management system, one or more power sources, and any other components associated with generation, management, and distribution of power in the terminal 900.

The multimedia component 908 comprises a screen providing an output interface between the terminal 900 and the user. In some embodiments, the screen may comprise a liquid crystal display (LCD) and a touch panel (TP). If the screen comprises a touch panel, the screen can be implemented as a touch screen to receive input signals from the user. The touch panel comprises one or more touch sensors to sense touches, swipes, and gestures on the touch panel. The touch sensors may not only sense a boundary of a touch or swipe action, but also sense the duration and pressure associated with the touch or swipe action. In some embodiments, the multimedia component 908 comprises a front camera and/or a rear camera. The front camera and the rear camera can receive external multimedia data while the terminal 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 comprises a microphone (MIC) configured to receive external audio signals when the terminal 900 is in an operation mode, such as a call mode, a recording mode, and a voice recognition mode. The received audio signal may be further stored in the memory 904 or transmitted via the communication component 916. In some embodiments, the audio component 910 further comprises a speaker for outputting audio signals.

The I/O interface 912 provides an interface between the processing component 902 and peripheral interface modules, such as a keyboard, a click wheel, buttons, and the like. The buttons may comprise, but are not limited to, a home button, a volume button, a start button, and a lock button.

The sensor component 914 comprises one or more sensors to provide status assessments of various aspects of the terminal 900. For instance, the sensor component 914 may detect an ON/OFF status of the terminal 900, relative positioning of components, e.g., the display device and the mini keyboard of the terminal 900, and the sensor component 914 may further detect a position change of the terminal 900 or a component of the terminal 900, presence or absence of user contact with the terminal 900, orientation or acceleration/deceleration of the terminal 900, and temperature change of the terminal 900. The sensor component 914 may comprise a proximity sensor configured to detect the presence of nearby objects without any physical contact. The sensor component 914 may further comprise a light sensor, such as a CMOS or CCD image sensor, configured for imaging applications. In some embodiments, the sensor component 914 may further comprise an accelerometer sensor, a gyroscope sensor, a magnetic sensor, a pressure sensor, or a temperature sensor.

The communication component 916 is configured to facilitate communication, wired or wirelessly, between the terminal 900 and other devices. The terminal 900 can access a wireless network based on a communication standard, such as Wi-Fi, 2G, or 3G, or a combination thereof. In an exemplary embodiment, the communication component 916 receives broadcast signals or broadcast associated information from an external broadcast management system via a broadcast channel. In an exemplary embodiment, the communication component 916 further comprises a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal 900 may be implemented with one or more application specific integrated circuits (ASICs), digital signal processors (DSPs), digital signal processing devices (DSPDs), programmable logic devices (PLDs), field programmable gate arrays (FP- GAs), controllers, micro-controllers, microprocessors, or other electronic components, to perform the above described methods.

In exemplary embodiments, a non-transitory computer-readable storage medium comprising instructions is further provided, such as the memory 704 comprising instructions, executable by the processor 720 in the terminal 700, for performing the above-described methods. For example, the non-transitory computer-readable storage medium may be a ROM, a RAM, a CD-ROM, a magnetic tape, a floppy disc, an optical data storage device, and the like.

Figure 10:
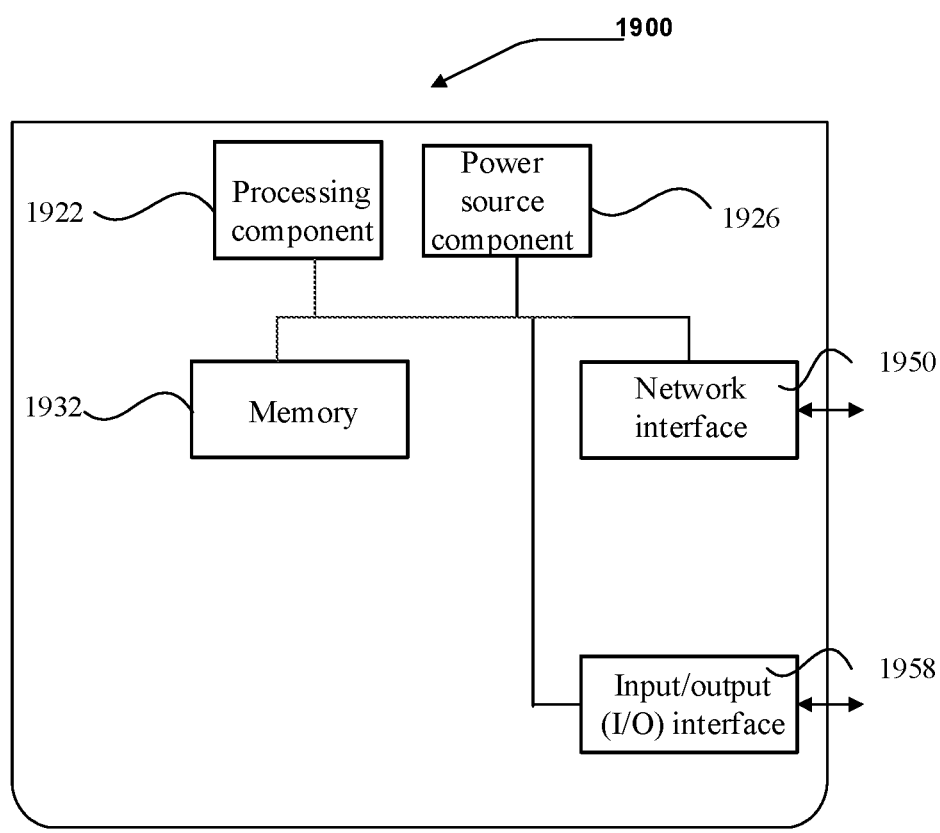
FIG. 10 is a schematic structural view of a base station according to an exemplary embodiment.

FIG. 10 is a block diagram of a base station 1900 illustrated according to an exemplary embodiment. The base station 1900 may be configured as a sending end or a receiving end in the above embodiment. Referring to FIG. 10, the base station 1900 comprises a processing component 1922 that further comprises one or more processors, and memory resources represented by memory 1932 for storing instructions executable by the processing component 1922, such as an application. An application stored in memory 1932 may comprise one or more modules each corresponding to a set of instructions. In addition, the processing component 1922 is configured to execute instructions to perform the method of data packet processing in the data bearer remapping process described above.

The base station 1900 may further comprise a power component 1926 configured to perform power management of base station 1900, a wired or wireless network interface 1950 configured to connect base station 1900 to the network, and an input/output (I/O) interface 1958.

The base station 1900 may comprise a memory 1932, and one or more programs, wherein the one or more programs are stored in the memory 1932, and configured to be executed by one or more processors, the one or more programs comprising the method performed by the above sending end or the receiving end.

In an exemplary embodiment, it further provides a computer readable storage medium comprising instructions, such as a memory 1932 comprising instructions executable by a processor of base station 1900 to complete the method performed by the above described sending or the above receiving end. For example, the computer readable storage medium can be a ROM, a random-access memory (RAM), a CD-ROM, a magnetic tape, a floppy disk, and an optical data storage device.

Other embodiments of the present disclosure will be apparent to those skilled in the art from consideration of the specification and practice of the present disclosure. This application is intended to cover any variations, uses, or adaptations of the present disclosure following the general principles thereof and comprising common knowledge or commonly used technical measures which are not disclosed herein. The specification and embodiments are to be considered as exemplary only, with a true scope and spirit of the present disclosure is indicated by the following claims.

It will be appreciated that the present disclosure is not limited to the exact construction that has been described above and illustrated in the accompanying drawings, and that various modifications and changes can be made without departing from the scope thereof.

The invention claimed is:

1. A method of processing data packets in a data bearer remapping process, comprising:
    stopping delivering, to an original data radio bearer (DRB), a data packet of a target data stream, and delivering, to a target DRB, the data packet of the target data stream that is not delivered to the original DRB, upon detecting occurrence of a DRB remapping event in a data transmission process of the target data stream; and
    sending a predetermined quantity of transmission completion indication messages to a receiving end through the original DRB when the original DRB is configured to operate in a non-transmission feedback determination mode, after detecting that the data packet of the target data stream delivered to the original DRB has been sent;
    wherein the predetermined quantity of transmission completion indication messages are used to indicate that the data packet of the target data stream delivered to the original DRB in the data bearer remapping process has been sent; and each of the predetermined quantity of transmission completion indication messages comprises an original DRB identifier, a target data stream identifier, and an identifier indicating that the data packet of the target data stream that has been delivered to the original DRB has been sent;
    the method further comprising performing a sequential delivery processing on the data packet of the target data stream sent by a sending end through the target DRB in the data bearer remapping process after receiving any transmission completion indication message sent by the sending end through the original DRB of the sending end by:
        detecting whether the data packet of the target data stream sent by the sending end through the original DRB in the data bearer remapping process comprises an out-of-order data packet on which a reordering operation is not performed after receiving any transmission completion indication message sent by the sending end through the original DRB of the sending end; and
        when the data packet of the target data stream sent by the sending end through the original DRB in the data bearer remapping process comprises the out-of-order data packet, performing the sequential delivery processing after the out-of-order data packet is sorted.

2. The method according to claim 1, wherein the predetermined quantity of transmission completion indication messages are generated by a Service Data Adaptation Protocol (SDAP) layer or a Packet Data Convergence Protocol (PDCP) layer.

3. The method according to claim 1, wherein the predetermined quantity of transmission completion indication messages further comprise a preset ending indication information.

4. The method according to claim 1, wherein the predetermined quantity of transmission completion indications messages are generated by a Service Data Adaptation Protocol (SDAP) layer and is a SDAP Packet Data Unit (PDU) data packet, a header of the SDAP PDU data packet comprises the target data stream identifier, and a body of the SDAP PDU data packet is empty.

5. The method according to claim 1, wherein said stopping comprises:
    when it is determined that the original DRB and the target DRB operate in a sequential transmission mode simultaneously, stopping delivering, to the original DRB, the data packet of the target data stream, and delivering, to the target DRB, the data packet of the target data stream that is not delivered to the original DRB, upon detecting occurrence of the DRB remapping event in the data transmission process of the target data stream.

6. A communication system implementing the method according to claim 1, comprising the sending end and the receiving end, wherein:
the receiving end is configured to:
receive the data packet of the target data stream sent by the sending end; and
perform the sequential delivery processing on the data packet of the target data stream sent by the sending end through the target DRB in the data bearer remapping process after receiving any transmission completion indication message sent by the sending end through the original DRB of the sending end, wherein the transmission completion indication message is used to indicate that the data packet of the target data stream delivered to the original DRB of the sending end in the data bearer remapping process has been sent;
wherein:
upon that a packet loss event occurs in said sending the predetermined quantity of transmission completion indication messages, without the sending end determining whether the packet loss event has occurred, the predetermined quantity of transmission completion indication messages are sent to the receiving end by the original DRB;
the predetermined quantity is pre-configured in the sending end; and
upon that the predetermined quantity of transmission completion indication messages are sent to the receiving end by the original DRB, a probability of successfully sending the predetermined quantity of transmission completion indication messages to the receiving end by the original DRB is therefore improved, thereby alleviating a situation where the receiving end cannot perform further delivery processing on the received data packet and the data packet delivery process is delayed indefinitely.

7. A method of processing data packets in a data bearer remapping process, comprising:
receiving a data packet of a target data stream sent by a sending end; and
performing a sequential delivery processing on the data packet of the target data stream sent by the sending end through a target data radio bearer (DRB) in the data bearer remapping process after receiving any transmission completion indication message sent by the sending end through an original DRB of the sending end, wherein the transmission completion indication message is used to indicate that the data packet of the target data stream delivered to the original DRB of the sending end in the data bearer remapping process has been sent; and the transmission completion indication message comprises an original DRB identifier, a target data stream identifier, and an identifier indicating that the data packet of the target data stream that has been delivered to the original DRB has been sent,
wherein said performing comprises:
detecting whether the data packet of the target data stream sent by the sending end through the original DRB in the data bearer remapping process comprises an out-of-order data packet on which a reordering operation is not performed after receiving any transmission completion indication message sent by the sending end through the original DRB of the sending end; and
when the data packet of the target data stream sent by the sending end through the original DRB in the data bearer remapping process comprises the out-of-order data packet, performing the sequential delivery processing after the out-of-order data packet is sorted.

8. The method according to claim 7, wherein the method further comprises:
starting a timer to perform timing upon detecting occurrence of a DRB remapping event in a data transmission process of the target data stream; and
performing the sequential delivery processing on the data packet of the target data stream sent by the sending end through the target DRB in the data bearer remapping process after the timer expires.

9. The method according to claim 7, wherein the method further comprises:
starting a timer to perform timing when receiving a first data packet of the target data stream sent by the sending end through the target DRB of the sending end; and
performing the sequential delivery processing on the data packet of the target data stream sent by the sending end through the target DRB in the data bearer remapping process after the timer expires.

10. An apparatus implementing the method according to claim 7, comprising one or more processors configured to:
start a timer to perform timing upon
detecting occurrence of the DRB remapping event in a data transmission process of the target data stream, or
receiving a first data packet of the target data stream sent by the sending end through the target DRB of the sending end; and
perform the sequential delivery processing on the data packet of the target data stream sent by the sending end through the target DRB in the data bearer remapping process, after the timer expires.

11. An apparatus configured to process data packets in a data bearer remapping process, comprising:
one or more processors; and
memory on which at least one instruction is stored;
wherein when the at least one instruction is executed by the one or more processors, the one or more processors are configured to
stop delivering to an original data radio bearer (DRB) a data packet of a target data stream, and deliver to a target DRB the data packet of the target data stream that is not delivered to the original DRB, upon detecting occurrence of a DRB remapping event in a data transmission process of the target data stream; and
send a predetermined quantity of transmission completion indication messages to a receiving end through the original DRB when the original DRB is configured to operate in a non-transmission feedback determination mode, after detecting that the data packet of the target data stream delivered to the original DRB has been sent;
wherein the predetermined quantity of transmission completion indication messages are used to indicate that the data packet of the target data stream delivered to the original DRB in the data bearer remapping process has been sent; and each of the predetermined quantity of transmission completion indication messages comprises an original DRB identifier, a target data stream identifier, and an identifier indicating that the data packet of the target data stream that has been delivered to the original DRB has been sent;
the one or more processors are further configured to perform a sequential delivery processing on the data packet of the target data stream sent by a sending end through the target DRB in the data bearer remapping process after receiving any transmission completion indication message sent by the sending end through the original DRB of the sending end by:
  detecting whether the data packet of the target data stream sent by the sending end through the original DRB in the data bearer remapping process comprises an out-of-order data packet on which a reordering operation is not performed after receiving any transmission completion indication message sent by the sending end through the original DRB of the sending end; and
  when the data packet of the target data stream sent by the sending end through the original DRB in the data bearer remapping process comprises the out-of-order data packet, performing the sequential delivery processing after the out-of-order data packet is sorted.

12. The data transmitting apparatus according to claim 11, wherein the predetermined quantity of transmission completion indication messages are generated by a Service Data Adaptation Protocol (SDAP) layer or a Packet Data Convergence Protocol (PDCP) layer.

13. The data transmitting apparatus according to claim 11, wherein the predetermined quantity of transmission completion indication messages further comprise a preset ending indication information.

14. The data transmitting apparatus according to claim 11, wherein the predetermined quantity of transmission completion indication messages are generated by a Service Data Adaptation Protocol (SDAP) layer and is a SDAP Packet Data Unit (PDU) data packet, a header of the SDAP PDU data packet comprises the target data stream identifier, and a body of the SDAP PDU data packet is empty.

15. The data transmitting apparatus according to claim 11, wherein, when it is determined that the original DRB and the target DRB operate in a sequential transmission mode simultaneously, the one or more processors are further configured to stop delivering, to the original DRB, the data packet of the target data stream, and deliver, to the target DRB, the data packet of the target data stream that is not delivered to the original DRB, upon detecting occurrence of the DRB remapping event in the data transmission process of the target data stream.

* * * * *